United States Patent
Lin

(10) Patent No.: US 9,874,719 B2
(45) Date of Patent: Jan. 23, 2018

(54) MOBILE DEVICE AND OPTICAL IMAGING LENS THEREOF

(71) Applicant: GeniuS Electronic Optical Co., Ltd., Taichung (TW)

(72) Inventor: Yu-Jen Lin, Taichung (TW)

(73) Assignee: GeniuS Electronic Optical (Xiamen) Co., Ltd, Xiamen (CN)

( * ) Notice: Subject to any disclaimer, the term of this patent is extended or adjusted under 35 U.S.C. 154(b) by 49 days.

(21) Appl. No.: 14/724,790

(22) Filed: May 28, 2015

(65) Prior Publication Data

US 2016/0261780 A1    Sep. 8, 2016

(30) Foreign Application Priority Data

Mar. 6, 2015    (CN) .......................... 2015 1 0100173

(51) Int. Cl.
| | | |
|---|---|---|
| G02B 13/18 | (2006.01) | |
| G02B 13/00 | (2006.01) | |
| G02B 9/60  | (2006.01) | |

(52) U.S. Cl.
CPC ........... *G02B 13/0045* (2013.01); *G02B 9/60* (2013.01)

(58) Field of Classification Search
CPC . G02B 9/00; G02B 9/60; G02B 13/00; G02B 13/001; G02B 13/0015; G02B 13/002; G02B 13/0045
See application file for complete search history.

(56) References Cited

U.S. PATENT DOCUMENTS

| | | | | |
|---|---|---|---|---|
| 8,179,614 B1* | 5/2012 | Tsai | ................... | G02B 13/0045 359/714 |
| 8,531,786 B2* | 9/2013 | Tsai | ................... | G02B 13/0045 359/714 |
| 8,953,256 B2* | 2/2015 | Noda | ....................... | G02B 3/04 359/714 |
| 2010/0253829 A1* | 10/2010 | Shinohara | .......... | G02B 13/0045 348/340 |
| 2013/0050847 A1* | 2/2013 | Hsu | ......................... | G02B 9/60 359/714 |
| 2014/0293453 A1* | 10/2014 | Ogino | ................ | G02B 13/0045 359/714 |
| 2014/0340537 A1* | 11/2014 | Eromaki | .................. | G03B 5/06 348/208.8 |

(Continued)

FOREIGN PATENT DOCUMENTS

| | | |
|---|---|---|
| CN | 103630998 | 3/2014 |
| CN | 104007536 | 8/2014 |

(Continued)

OTHER PUBLICATIONS

Official Action from Chinese Patent Application No. 201510100173.5 dated Jan. 4, 2017.

*Primary Examiner* — Thong Nguyen
(74) *Attorney, Agent, or Firm* — Baker & McKenzie LLP

(57) ABSTRACT

Present embodiments may provide for a mobile device and an optical imaging lens thereof. The optical imaging lens may comprise an aperture stop and five lens elements positioned sequentially from an object side to an image side. By controlling the convex or concave shape of the surfaces of the lens elements and designing parameters satisfying at least one inequality, the optical imaging lens may exhibit better optical characteristics and the total length of the optical imaging lens may be shortened.

14 Claims, 28 Drawing Sheets

(56) References Cited

U.S. PATENT DOCUMENTS

2015/0198790 A1* 7/2015 Tanaka ............... G02B 13/0045
359/714

FOREIGN PATENT DOCUMENTS

| CN | 104122655 | 10/2014 |
| --- | --- | --- |
| TW | 201307883 | 2/2013 |
| TW | 201433818 | 9/2014 |
| TW | 201441652 | 11/2014 |
| TW | 201441654 | 11/2014 |

* cited by examiner

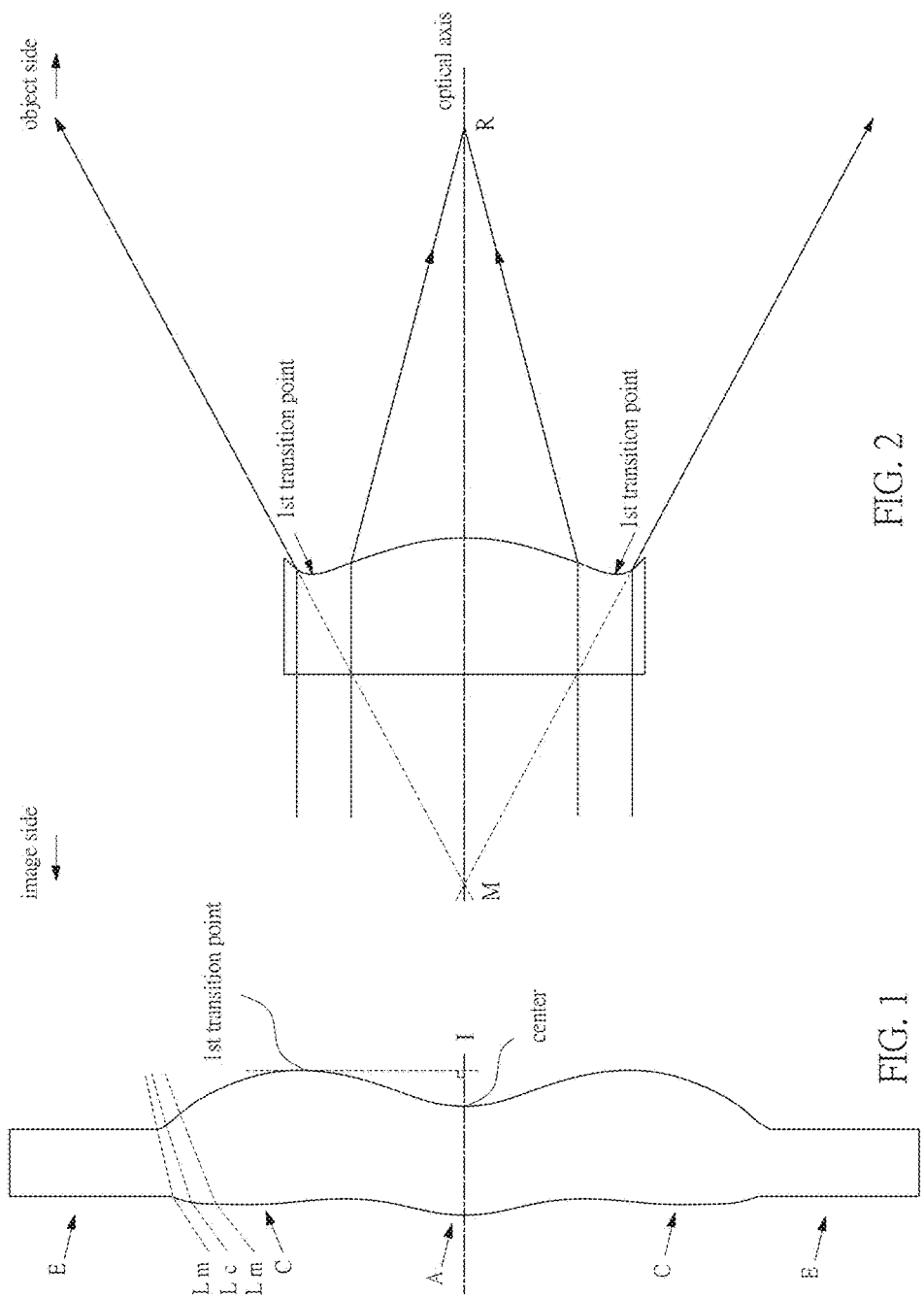

| EFL(Effective focal length)= 3.973mm, HFOV(Half angular field of view)= 36deg., System length=5.193mm, Image height= 2.698mm, Fno=2.2 | | | | | | | |
|---|---|---|---|---|---|---|---|
| Surface # | | Radius | Thickness / air gap | Refractive index | Abbe number | Focal length | Material |
| - | Object | ∞ | | | | | |
| 100 | Aperture stop | ∞ | -0.1924(TA) | | | | |
| 111 | 1st lens element | 2.0667 | 0.6889(T1) | 1.544 | 56.114 | 3.578 | plastic |
| 112 | | -37.5186 | 0.1472(G12) | | | | |
| 121 | 2nd lens lement | -27.2546 | 0.2413(T2) | 1.643 | 22.437 | -5.232 | plastic |
| 122 | | 3.9918 | 0.2465(G23) | | | | |
| 131 | 3rd lens element | 2.0248 | 0.3323(T3) | 1.544 | 56.114 | 21.387 | plastic |
| 132 | | 2.3025 | 0.4861(G34) | | | | |
| 141 | 4th lens element | -130.8659 | 0.7081(T4) | 1.544 | 56.114 | 8.548 | plastic |
| 142 | | -4.5541 | 0.2677(G45) | | | | |
| 151 | 5th lens element | 2.1252 | 0.7778(T5) | 1.544 | 56.114 | -24.744 | plastic |
| 152 | | 1.5996 | 0.2998(G5F) | | | | |
| 161 | IR cut filter | ∞ | 0.3000(TF) | 1.517 | 64.167 | | |
| 162 | | ∞ | 0.6975(GFP) | | | | |
| 170 | Image plane | ∞ | 0.0000 | | | | |

FIG. 8

| Aspherical parameters | | | | | |
|---|---|---|---|---|---|
| Surface # | 111 | 112 | 121 | 122 | 131 |
| K | -9.151431E-01 | -5.001025E+01 | 5.000429E+01 | 9.940646E+00 | -5.956619E+00 |
| $a_4$ | -6.969892E-03 | -5.558817E-02 | 3.268315E-02 | 1.603120E-02 | -2.121690E-02 |
| $a_6$ | -1.772538E-02 | -2.314874E-02 | -2.252454E-02 | 2.267540E-02 | -1.439554E-02 |
| $a_8$ | 1.185880E-03 | 3.995261E-03 | 1.181802E-02 | -1.491425E-02 | 2.706535E-02 |
| $a_{10}$ | -1.246210E-02 | -9.121067E-05 | 7.217112E-03 | -3.446663E-03 | -8.568956E-03 |
| $a_{12}$ | -2.574879E-04 | -2.069879E-04 | 2.835657E-04 | -4.298795E-04 | 7.118831E-06 |
| $a_{14}$ | 4.797962E-06 | -3.931292E-04 | 1.761501E-04 | -2.310115E-04 | 1.842568E-06 |
| $a_{16}$ | 2.898959E-04 | -2.255893E-04 | 1.945456E-05 | -9.602407E-05 | -9.987172E-07 |
| Surface # | 132 | 141 | 142 | 151 | 152 |
| K | -6.533578E-01 | -5.000002E+01 | 6.896726E+00 | -3.884597E+00 | -9.697848E-01 |
| $a_4$ | -5.309552E-02 | 2.757843E-02 | -1.008618E-01 | -1.939725E-01 | -1.790150E-01 |
| $a_6$ | -2.082704E-02 | -4.804346E-02 | 6.615509E-02 | 2.155295E-02 | 4.425799E-02 |
| $a_8$ | 2.219439E-02 | 1.013763E-02 | -3.520221E-02 | 8.077520E-03 | -7.283213E-03 |
| $a_{10}$ | -4.037041E-03 | -2.003615E-03 | 8.535343E-03 | -1.322333E-03 | 4.841427E-04 |
| $a_{12}$ | -8.504636E-06 | -3.168426E-05 | 1.168710E-05 | -1.685539E-06 | 4.689522E-07 |
| $a_{14}$ | -5.594285E-06 | -3.355515E-05 | 5.682417E-06 | -3.805844E-07 | 6.483034E-08 |
| $a_{16}$ | -4.108909E-06 | -2.358736E-05 | 2.446545E-06 | -8.497290E-08 | 1.058869E-08 |

FIG. 9

| EFL(Effective focal length)= 3.66mm, HFOV(Half angular field of view)= 36deg., System length=5.037mm, Image height= 2.633mm, Fno=2.2 |||||||| 
|---|---|---|---|---|---|---|---|
| Surface # | | Radius | Thickness / air gap | Refractive index | Abbe number | Focal length | Material |
| - | Object | ∞ | | | | | |
| 200 | Aperture stop | ∞ | -0.1924(TA) | | | | |
| 211 | 1st lens element | 2.0701 | 0.6031(T1) | 1.544 | 56.114 | 3.592 | plastic |
| 212 | | -40.1771 | 0.1613(G12) | | | | |
| 221 | 2nd lens lement | -25.7058 | 0.2852(T2) | 1.643 | 22.437 | -5.177 | plastic |
| 222 | | 3.9825 | 0.2372(G23) | | | | |
| 231 | 3rd lens element | 2.0440 | 0.3507(T3) | 1.544 | 56.114 | 24.331 | plastic |
| 232 | | 2.2649 | 0.4694(G34) | | | | |
| 241 | 4th lens element | -221.0222 | 0.6703(T4) | 1.544 | 56.114 | 8.347 | plastic |
| 242 | | -4.5094 | 0.2230(G45) | | | | |
| 251 | 5th lens element | 1.9107 | 0.6946(T5) | 1.544 | 56.114 | 32.309 | plastic |
| 252 | | 1.8641 | 0.3223(G5F) | | | | |
| 261 | IR cut filter | ∞ | 0.3000(TF) | 1.517 | 64.167 | | |
| 262 | | ∞ | 0.7200(GFP) | | | | |
| 270 | Image plane | ∞ | 0.0000 | | | | |

FIG. 12

| Aspherical parameters | | | | | |
|---|---|---|---|---|---|
| Surface # | 211 | 212 | 221 | 222 | 231 |
| K | -9.967025E-01 | -5.000010E+01 | 5.000009E+01 | 9.639500E+00 | -6.264200E+00 |
| $a_4$ | -8.138584E-03 | -5.229845E-02 | 3.054862E-02 | 1.607292E-02 | -2.095138E-02 |
| $a_6$ | -1.772538E-02 | -2.314874E-02 | -2.252454E-02 | 2.267540E-02 | -1.439554E-02 |
| $a_8$ | -3.910663E-04 | 9.646657E-03 | 1.301860E-02 | -2.246102E-02 | 2.791501E-02 |
| $a_{10}$ | -1.273286E-02 | 5.660595E-03 | 7.392035E-03 | -8.466263E-03 | -8.492051E-03 |
| $a_{12}$ | 2.671299E-03 | 5.737169E-03 | -3.733127E-04 | -2.311230E-03 | -3.599754E-04 |
| $a_{14}$ | 8.633185E-03 | 4.561527E-03 | -4.413394E-04 | -5.334399E-04 | -5.316559E-04 |
| $a_{16}$ | 1.820685E-02 | 2.349423E-03 | -1.807929E-04 | 5.387639E-05 | -5.365462E-04 |
| Surface # | 232 | 241 | 242 | 251 | 252 |
| K | -7.749877E-01 | -3.379669E+01 | 6.954872E+00 | -3.906704E+00 | -8.973141E-01 |
| $a_4$ | -5.427371E-02 | 3.196239E-02 | -1.067386E-01 | -1.938286E-01 | -1.762651E-01 |
| $a_6$ | -2.082704E-02 | -4.804346E-02 | 6.615509E-02 | 2.155295E-02 | 4.425799E-02 |
| $a_8$ | 2.115878E-02 | 1.084987E-02 | -3.532094E-02 | 8.069202E-03 | -7.250067E-03 |
| $a_{10}$ | -4.458120E-03 | -1.997134E-03 | 8.603020E-03 | -1.322726E-03 | 4.857912E-04 |
| $a_{12}$ | -1.406946E-04 | -1.640846E-04 | 5.608728E-05 | -1.283849E-06 | 4.603502E-07 |
| $a_{14}$ | -2.613703E-05 | -1.517833E-04 | 2.549855E-05 | -1.522067E-07 | 4.756476E-08 |
| $a_{16}$ | 8.570110E-06 | -1.030720E-04 | 1.041873E-05 | 7.079384E-09 | 7.376917E-09 |

FIG. 13

| EFL(Effective focal length)= 4.109mm, HFOV(Half angular field of view)= 36deg., System length=5.204mm, Image height= 2.789mm, Fno=2.2 |||||||
|---|---|---|---|---|---|---|---|
| Surface # | | Radius | Thickness / air gap | Refractive index | Abbe number | Focal length | Material |
| - | Object | ∞ | | | | | |
| 300 | Aperture stop | ∞ | -0.1924(TA) | | | | |
| 311 | 1st lens element | 2.0679 | 0.7201(T1) | 1.544 | 56.114 | 3.576 | plastic |
| 312 | | -36.4394 | 0.1493(G12) | | | | |
| 321 | 2nd lens element | -27.5685 | 0.2539(T2) | 1.643 | 22.437 | -5.236 | plastic |
| 322 | | 3.9896 | 0.2042(G23) | | | | |
| 331 | 3rd lens element | 2.0255 | 0.3353(T3) | 1.544 | 56.114 | 21.361 | plastic |
| 332 | | 2.3028 | 0.4891(G34) | | | | |
| 341 | 4th lens element | -116.9394 | 0.6995(T4) | 1.544 | 56.114 | 8.595 | plastic |
| 342 | | -4.5602 | 0.2743(G45) | | | | |
| 351 | 5th lens element | 2.1609 | 0.7802(T5) | 1.544 | 56.114 | -14.896 | plastic |
| 352 | | 1.4911 | 0.3003(G5F) | | | | |
| 361 | IR cut filter | ∞ | 0.3000(TF) | 1.517 | 64.167 | | |
| 362 | | ∞ | 0.6980(GFP) | | | | |
| 370 | Image plane | ∞ | 0.0000 | | | | |

FIG. 16

| Aspherical parameters | | | | | |
|---|---|---|---|---|---|
| Surface # | 311 | 312 | 321 | 322 | 331 |
| K | -9.002909E-01 | -5.004823E+01 | 5.001477E+01 | 9.965680E+00 | -5.911268E+00 |
| $a_4$ | -6.755512E-03 | -5.594278E-02 | 3.296387E-02 | 1.593488E-02 | -2.112855E-02 |
| $a_6$ | -1.772538E-02 | -2.314874E-02 | -2.252454E-02 | 2.267540E-02 | -1.439554E-02 |
| $a_8$ | 1.489873E-03 | 3.563564E-03 | 1.171608E-02 | -1.419425E-02 | 2.696827E-02 |
| $a_{10}$ | -1.219170E-02 | -3.291174E-04 | 7.112654E-03 | -2.899524E-03 | -8.632127E-03 |
| $a_{12}$ | -7.284087E-05 | -3.074906E-04 | 2.291550E-04 | -1.372110E-04 | -2.904268E-05 |
| $a_{14}$ | 7.960437E-05 | -4.472061E-04 | 1.734327E-04 | -1.010430E-04 | -1.774265E-05 |
| $a_{16}$ | 2.538589E-04 | -2.833547E-04 | 6.067816E-05 | -5.655197E-05 | -1.155504E-05 |
| Surface # | 332 | 341 | 342 | 351 | 352 |
| K | -6.480568E-01 | -5.002909E+01 | 6.893566E+00 | -3.937025E+00 | -9.442300E-01 |
| $a_4$ | -5.305280E-02 | 2.690374E-02 | -1.001667E-01 | -1.938238E-01 | -1.776147E-01 |
| $a_6$ | -2.082704E-02 | -4.804346E-02 | 6.615509E-02 | 2.155295E-02 | 4.425799E-02 |
| $a_8$ | 2.226368E-02 | 9.863895E-03 | -3.516327E-02 | 8.089914E-03 | -7.292501E-03 |
| $a_{10}$ | -4.000855E-03 | -2.077526E-03 | 8.533307E-03 | -1.319708E-03 | 4.825046E-04 |
| $a_{12}$ | 1.118108E-05 | -3.983076E-05 | 6.779448E-06 | -1.141956E-06 | 2.029119E-07 |
| $a_{14}$ | 6.078528E-06 | -2.614103E-05 | 2.863945E-06 | -2.710315E-07 | 2.172999E-08 |
| $a_{16}$ | 3.342206E-06 | -1.557559E-05 | 1.176027E-06 | -6.389979E-08 | 3.588706E-09 |

FIG. 17

| EFL(Effective focal length)= 4.123mm, HFOV(Half angular field of view)= 36deg., System length=5.217mm, Image height= 2.786mm, Fno=2.2 ||||||||
|---|---|---|---|---|---|---|---|
| Surface # | | Radius | Thickness / air gap | Refractive index | Abbe number | Focal length | Material |
| - | Object | ∞ | | | | | |
| 400 | Aperture stop | ∞ | -0.1924(TA) | | | | |
| 411 | 1st lens element | 2.0628 | 0.7050(T1) | 1.544 | 56.114 | 3.574 | plastic |
| 412 | | -38.0359 | 0.1493(G12) | | | | |
| 421 | 2nd lens element | -27.5075 | 0.2491(T2) | 1.643 | 22.437 | -5.237 | plastic |
| 422 | | 3.9915 | 0.2404(G23) | | | | |
| 431 | 3rd lens element | 2.0271 | 0.3363(T3) | 1.544 | 56.114 | 21.357 | plastic |
| 432 | | 2.3048 | 0.4859(G34) | | | | |
| 441 | 4th lens element | -116.2988 | 0.6979(T4) | 1.544 | 56.114 | 8.595 | plastic |
| 442 | | -4.5593 | 0.2749(G45) | | | | |
| 451 | 5th lens element | 2.1478 | 0.7792(T5) | 1.544 | 56.114 | -14.655 | plastic |
| 452 | | 1.4779 | 0.3006(G5F) | | | | |
| 461 | IR cut filter | ∞ | 0.3000(TF) | 1.517 | 64.167 | | |
| 462 | | ∞ | 0.6982(GFP) | | | | |
| 470 | Image plane | ∞ | 0.0000 | | | | |

FIG. 20

| Aspherical parameters | | | | | |
|---|---|---|---|---|---|
| Surface # | 411 | 412 | 421 | 422 | 431 |
| K | -9.000039E-01 | -5.005790E+01 | 5.001673E+01 | 9.957686E+00 | -5.901104E+00 |
| $a_4$ | -6.750804E-03 | -5.594809E-02 | 3.298922E-02 | 1.588350E-02 | -2.105618E-02 |
| $a_6$ | -1.772538E-02 | -2.314874E-02 | -2.252454E-02 | 2.267540E-02 | -1.439554E-02 |
| $a_8$ | 1.420804E-03 | 3.588170E-03 | 1.173400E-02 | -1.422867E-02 | 2.699577E-02 |
| $a_{10}$ | -1.231053E-02 | -2.983560E-04 | 7.128150E-03 | -2.923100E-03 | -8.617011E-03 |
| $a_{12}$ | -2.489790E-04 | -2.774080E-04 | 2.449160E-04 | -1.537840E-04 | -2.080800E-05 |
| $a_{14}$ | -1.612540E-04 | -4.231890E-04 | 1.916390E-04 | -1.137650E-04 | -1.330600E-05 |
| $a_{16}$ | -5.948100E-05 | -2.690340E-04 | 8.276500E-05 | -6.754200E-05 | -9.199000E-06 |
| Surface # | 432 | 441 | 442 | 451 | 452 |
| K | -6.546610E-01 | -5.002525E+01 | 6.897035E+00 | -3.939109E+00 | -9.422663E-01 |
| $a_4$ | -5.312730E-02 | 2.694992E-02 | -1.002242E-01 | -1.937959E-01 | -1.774494E-01 |
| $a_6$ | -2.082704E-02 | -4.804346E-02 | 6.615509E-02 | 2.155295E-02 | 4.425799E-02 |
| $a_8$ | 2.224498E-02 | 9.899879E-03 | -3.518107E-02 | 8.091611E-03 | -7.293149E-03 |
| $a_{10}$ | -4.009792E-03 | -2.060054E-03 | 8.527179E-03 | -1.319335E-03 | 4.823570E-04 |
| $a_{12}$ | 6.933000E-06 | -3.121900E-05 | 4.612000E-06 | -1.058000E-06 | 1.780000E-07 |
| $a_{14}$ | 4.109000E-06 | -2.179400E-05 | 2.078000E-06 | -2.520000E-07 | 1.800000E-08 |
| $a_{16}$ | 2.463000E-06 | -1.335500E-05 | 8.870000E-07 | -6.000000E-08 | 3.000000E-09 |

FIG. 21

| Surface # | | Radius | Thickness / air gap | Refractive index | Abbe number | Focal length | Material |
|---|---|---|---|---|---|---|---|
| | EFL(Effective focal length)= 4.112mm, HFOV(Half angular field of view)= 36deg., System length=5.234mm, Image height= 2.758mm, Fno=2.2 |
| - | Object | ∞ | | | | | |
| 500 | Aperture stop | ∞ | -0.1924(TA) | | | | |
| 511 | 1st lens element | 2.0695 | 0.7078(T1) | 1.544 | 56.114 | 3.576 | plastic |
| 512 | | -36.0305 | 0.1425(G12) | | | | |
| 521 | 2nd lens element | -27.4276 | 0.2503(T2) | 1.643 | 22.437 | -5.236 | plastic |
| 522 | | 3.9925 | 0.2449(G23) | | | | |
| 531 | 3rd lens element | 2.0250 | 0.3365(T3) | 1.544 | 56.114 | 21.345 | plastic |
| 532 | | 2.3019 | 0.4879(G34) | | | | |
| 541 | 4th lens element | -117.6491 | 0.7178(T4) | 1.544 | 56.114 | 8.590 | plastic |
| 542 | | -4.5592 | 0.2637(G45) | | | | |
| 551 | 5th lens element | 2.1837 | 0.7827(T5) | 1.544 | 56.114 | -15.902 | plastic |
| 552 | | 1.5254 | 0.3010(G5F) | | | | |
| 561 | IR cut filter | ∞ | 0.3000(TF) | 1.517 | 64.167 | | |
| 562 | | ∞ | 0.6987(GFP) | | | | |
| 570 | Image plane | ∞ | 0.0000 | | | | |

FIG. 24

| Aspherical parameters | | | | | |
|---|---|---|---|---|---|
| Surface # | 511 | 512 | 521 | 522 | 531 |
| K | -9.000291E-01 | -5.019223E+01 | 5.005028E+01 | 9.954264E+00 | -5.910450E+00 |
| $a_4$ | -6.751796E-03 | -5.592862E-02 | 3.297110E-02 | 1.589406E-02 | -2.107312E-02 |
| $a_6$ | -1.772538E-02 | -2.314874E-02 | -2.252454E-02 | 2.267540E-02 | -1.439554E-02 |
| $a_8$ | 1.513515E-03 | 3.553777E-03 | 1.181746E-02 | -1.432829E-02 | 2.699278E-02 |
| $a_{10}$ | -1.216154E-02 | -3.370340E-04 | 7.207368E-03 | -3.000335E-03 | -8.631977E-03 |
| $a_{12}$ | -2.713400E-05 | -3.068670E-04 | 2.938890E-04 | -1.866340E-04 | -3.520100E-05 |
| $a_{14}$ | 1.338940E-04 | -4.324240E-04 | 1.957020E-04 | -9.986400E-05 | -2.837900E-05 |
| $a_{16}$ | 3.174750E-04 | -2.446740E-04 | 4.077900E-05 | -1.442200E-05 | -2.225000E-05 |
| Surface # | 532 | 541 | 542 | 551 | 552 |
| K | -6.540538E-01 | -5.007978E+01 | 6.888910E+00 | -3.907079E+00 | -9.471571E-01 |
| $a_4$ | -5.311775E-02 | 2.703345E-02 | -1.003608E-01 | -1.937781E-01 | -1.778437E-01 |
| $a_6$ | -2.082704E-02 | -4.804346E-02 | 6.615509E-02 | 2.155295E-02 | 4.425799E-02 |
| $a_8$ | 2.224574E-02 | 9.968959E-03 | -3.518933E-02 | 8.090450E-03 | -7.292089E-03 |
| $a_{10}$ | -4.002467E-03 | -2.037791E-03 | 8.528603E-03 | -1.322218E-03 | 4.825940E-04 |
| $a_{12}$ | 1.520800E-05 | -2.696600E-05 | 6.455000E-06 | -1.132000E-06 | 1.940000E-07 |
| $a_{14}$ | 1.094400E-05 | -2.236300E-05 | 3.121000E-06 | -2.710000E-07 | 2.400000E-08 |
| $a_{16}$ | 7.366000E-06 | -1.467900E-05 | 1.376000E-06 | -6.500000E-08 | 4.000000E-09 |

FIG. 25

| EFL(Effective focal length)= 3.981mm, HFOV(Half angular field of view)= 36deg., System length=5.197mm, Image height= 2.728mm, Fno=2.2 ||||||||
|---|---|---|---|---|---|---|---|
| Surface # | | Radius | Thickness / air gap | Refractive index | Abbe number | Focal length | Material |
| - | Object | ∞ | | | | | |
| 600 | Aperture stop | ∞ | -0.1924(TA) | | | | |
| 611 | 1st lens element | 2.0713 | 0.7000(T1) | 1.544 | 56.114 | 3.583 | plastic |
| 612 | | -36.9223 | 0.1486(G12) | | | | |
| 621 | 2nd lens lement | -27.2851 | 0.2476(T2) | 1.643 | 22.437 | -5.221 | plastic |
| 622 | | 3.9819 | 0.2453(G23) | | | | |
| 631 | 3rd lens element | 2.0203 | 0.3336(T3) | 1.544 | 56.114 | 21.171 | plastic |
| 632 | | 2.3003 | 0.4873(G34) | | | | |
| 641 | 4th lens element | -117.4964 | 0.6979(T4) | 1.544 | 56.114 | 8.579 | plastic |
| 642 | | -4.5531 | 0.2724(G45) | | | | |
| 651 | 5th lens element | 2.0576 | 0.7764(T5) | 1.544 | 56.114 | -22.470 | plastic |
| 652 | | 1.5279 | 0.3001(G5F) | | | | |
| 661 | IR cut filter | ∞ | 0.3000(TF) | 1.517 | 64.167 | | |
| 662 | | ∞ | 0.6876(GFP) | | | | |
| 670 | Image plane | ∞ | 0.0000 | | | | |

FIG. 28

| Aspherical parameters | | | | | |
|---|---|---|---|---|---|
| Surface # | 611 | 612 | 621 | 622 | 631 |
| K | -9.016729E-01 | -5.006098E+01 | 5.001558E+01 | 1.017059E+01 | -5.926477E+00 |
| $a_4$ | -6.775968E-03 | -5.431333E-02 | 3.298556E-02 | 1.588229E-02 | -2.116508E-02 |
| $a_6$ | -1.772538E-02 | -2.314874E-02 | -2.252454E-02 | 2.267540E-02 | -1.439554E-02 |
| $a_8$ | 1.478987E-03 | 3.475289E-03 | 1.190200E-02 | -1.445301E-02 | 2.703530E-02 |
| $a_{10}$ | -1.220642E-02 | -4.106080E-04 | 7.284298E-03 | -3.141282E-03 | -8.579936E-03 |
| $a_{12}$ | -1.667430E-04 | -3.263030E-04 | 3.347500E-04 | -3.323140E-04 | 1.608000E-06 |
| $a_{14}$ | -2.024900E-05 | -4.111870E-04 | 1.937530E-04 | -2.376000E-04 | 8.160000E-07 |
| $a_{16}$ | 1.433960E-04 | -1.420490E-04 | -7.568000E-06 | -1.308680E-04 | -9.620000E-07 |
| Surface # | 632 | 641 | 642 | 651 | 652 |
| K | -6.448840E-01 | -4.999999E+01 | 6.896798E+00 | -3.896918E+00 | -9.549833E-01 |
| $a_4$ | -5.349361E-02 | 2.690321E-02 | -1.029089E-01 | -1.937203E-01 | -1.784435E-01 |
| $a_6$ | -2.082704E-02 | -4.804346E-02 | 6.615509E-02 | 2.155295E-02 | 4.425799E-02 |
| $a_8$ | 2.215140E-02 | 9.915549E-03 | -3.540034E-02 | 8.083673E-03 | -7.278425E-03 |
| $a_{10}$ | -4.023755E-03 | -2.057370E-03 | 8.515535E-03 | -1.320562E-03 | 4.874170E-04 |
| $a_{12}$ | -2.979000E-06 | -3.833900E-05 | 7.639000E-06 | -1.403000E-06 | 3.150000E-07 |
| $a_{14}$ | -2.028000E-06 | -2.791900E-05 | 3.533000E-06 | -3.180000E-07 | 3.800000E-08 |
| $a_{16}$ | -1.098000E-06 | -1.738700E-05 | 1.488000E-06 | -7.200000E-08 | 6.000000E-09 |

FIG. 29

| \multicolumn{7}{c}{EFL(Effective focal length)= 3.600mm, HFOV(Half angular field of view)= 36deg., System length=5.035mm, Image height= 2.690mm, Fno=2.2} |
|---|---|---|---|---|---|---|
| Surface # | | Radius | Thickness / air gap | Refractive index | Abbe number | Focal length | Material |
| - | Object | ∞ | | | | | |
| 700 | Aperture stop | ∞ | -0.1924(TA) | | | | |
| 711 | 1st lens element | 2.0441 | 0.6033(T1) | 1.544 | 56.114 | 3.586 | plastic |
| 712 | | -52.5372 | 0.1696(G12) | | | | |
| 721 | 2nd lens lement | -23.0468 | 0.2746(T2) | 1.643 | 22.437 | -5.171 | plastic |
| 722 | | 4.0504 | 0.2386(G23) | | | | |
| 731 | 3rd lens element | 1.9641 | 0.3840(T3) | 1.544 | 56.114 | 23.410 | plastic |
| 732 | | 2.1561 | 0.4721(G34) | | | | |
| 741 | 4th lens element | -201.8532 | 0.6431(T4) | 1.544 | 56.114 | 8.285 | plastic |
| 742 | | -4.4683 | 0.2159(G45) | | | | |
| 751 | 5th lens element | 1.8996 | 0.6863(T5) | 1.544 | 56.114 | 26.012 | plastic |
| 752 | | 1.9088 | 0.3246(G5F) | | | | |
| 761 | IR cut filter | ∞ | 0.3000(TF) | 1.517 | 64.167 | | |
| 762 | | ∞ | 0.7224(GFP) | | | | |
| 770 | Image plane | ∞ | 0.0000 | | | | |

FIG. 32

| Aspherical parameters | | | | | |
|---|---|---|---|---|---|
| Surface # | 711 | 712 | 721 | 722 | 731 |
| K | -1.019253E+00 | -5.000059E+01 | 4.999920E+01 | 9.188211E+00 | -6.163748E+00 |
| $a_4$ | -8.468698E-03 | -4.753478E-02 | 2.997073E-02 | 1.606562E-02 | -1.970695E-02 |
| $a_6$ | -1.772538E-02 | -2.314874E-02 | -2.252454E-02 | 2.267540E-02 | -1.439554E-02 |
| $a_8$ | -8.810350E-04 | 1.074149E-02 | 1.314653E-02 | -2.334780E-02 | 2.792714E-02 |
| $a_{10}$ | -1.295032E-02 | 6.906415E-03 | 7.279699E-03 | -9.190810E-03 | -8.560931E-03 |
| $a_{12}$ | 3.203737E-03 | 6.737656E-03 | 4.011430E-04 | -2.720748E-03 | -4.372290E-04 |
| $a_{14}$ | 1.092759E-02 | 4.890570E-03 | -1.281866E-03 | -7.479000E-04 | -7.026050E-04 |
| $a_{16}$ | 2.399237E-02 | 1.814685E-03 | -3.897281E-03 | -7.052270E-04 | -7.113390E-04 |
| Surface # | 732 | 741 | 742 | 751 | 752 |
| K | -7.975029E-01 | -4.483595E+01 | 6.932152E+00 | -3.815702E+00 | -8.586310E-01 |
| $a_4$ | -5.538186E-02 | 3.507418E-02 | -1.072549E-01 | -1.936745E-01 | -1.742376E-01 |
| $a_6$ | -2.082704E-02 | -4.804346E-02 | 6.615509E-02 | 2.155295E-02 | 4.425799E-02 |
| $a_8$ | 2.099220E-02 | 1.009583E-02 | -3.520191E-02 | 8.062861E-03 | -7.273625E-03 |
| $a_{10}$ | -4.555374E-03 | -2.051714E-03 | 8.665431E-03 | -1.325223E-03 | 4.827020E-04 |
| $a_{12}$ | -1.651290E-04 | -1.782480E-04 | 6.049400E-05 | -2.108000E-06 | -9.000000E-09 |
| $a_{14}$ | -2.580800E-05 | -1.563760E-04 | 2.743200E-05 | -5.030000E-07 | 1.000000E-09 |
| $a_{16}$ | 1.939600E-05 | -1.102580E-04 | 1.160600E-05 | -1.340000E-07 | 8.000000E-09 |

FIG. 33

| EFL(Effective focal length)= 4.127mm, HFOV(Half angular field of view)= 36deg., System length=5.215mm, Image height= 2.763mm, Fno=2.2 |||||||
|---|---|---|---|---|---|---|---|
| Surface # | | Radius | Thickness / air gap | Refractive index | Abbe number | Focal length | Material |
| - | Object | ∞ | | | | | |
| 800 | Aperture stop | ∞ | -0.1924(TA) | | | | |
| 811 | 1st lens element | 2.0575 | 0.7063(T1) | 1.544 | 56.114 | 3.570 | plastic |
| 812 | | -39.1534 | 0.1511(G12) | | | | |
| 821 | 2nd lens lement | -27.4996 | 0.2423(T2) | 1.643 | 22.437 | -5.240 | plastic |
| 822 | | 3.9941 | 0.2490(G23) | | | | |
| 831 | 3rd lens element | 2.0325 | 0.3365(T3) | 1.544 | 56.114 | 21.730 | plastic |
| 832 | | 2.3042 | 0.4849(G34) | | | | |
| 841 | 4th lens element | -118.6993 | 0.6899(T4) | 1.544 | 56.114 | 8.658 | plastic |
| 842 | | -4.5949 | 0.2759(G45) | | | | |
| 851 | 5th lens element | 2.1282 | 0.7788(T5) | 1.544 | 56.114 | -14.770 | plastic |
| 852 | | 1.4677 | 0.3011(G5F) | | | | |
| 861 | IR cut filter | ∞ | 0.3000(TF) | 1.517 | 64.167 | | |
| 862 | | ∞ | 0.6988(GFP) | | | | |
| 870 | Image plane | ∞ | 0.0000 | | | | |

FIG. 36

| Aspherical parameters | | | | | |
|---|---|---|---|---|---|
| Surface # | 811 | 812 | 821 | 822 | 831 |
| K | -8.991428E-01 | -5.101396E+01 | 5.022588E+01 | 9.954951E+00 | -5.896309E+00 |
| $a_4$ | -6.737829E-03 | -5.595981E-02 | 3.301368E-02 | 1.584439E-02 | -2.102021E-02 |
| $a_6$ | -1.772538E-02 | -2.314874E-02 | -2.252454E-02 | 2.267540E-02 | -1.439554E-02 |
| $a_8$ | 1.381447E-03 | 3.620307E-03 | 1.170496E-02 | -1.424741E-02 | 2.702248E-02 |
| $a_{10}$ | -1.238247E-02 | -2.285490E-04 | 7.046895E-03 | -2.907559E-03 | -8.602008E-03 |
| $a_{12}$ | -1.088130E-04 | -2.678480E-04 | 1.203370E-04 | -1.044790E-04 | -2.234000E-06 |
| $a_{14}$ | -9.358400E-05 | -2.364370E-04 | -1.836000E-06 | -5.293500E-05 | -4.058000E-06 |
| $a_{16}$ | -9.511800E-05 | -1.499510E-04 | -1.391340E-04 | -1.850100E-05 | -6.051000E-06 |
| Surface # | 832 | 841 | 842 | 851 | 852 |
| K | -6.554081E-01 | -5.006511E+01 | 6.873534E+00 | -3.893221E+00 | -9.546539E-01 |
| $a_4$ | -5.313528E-02 | 2.689515E-02 | -1.002888E-01 | -1.932427E-01 | -1.782156E-01 |
| $a_6$ | -2.082704E-02 | -4.804346E-02 | 6.615509E-02 | 2.155295E-02 | 4.425799E-02 |
| $a_8$ | 2.223804E-02 | 9.898091E-03 | -3.520561E-02 | 8.091384E-03 | -7.295045E-03 |
| $a_{10}$ | -4.008947E-03 | -2.054856E-03 | 8.519259E-03 | -1.319423E-03 | 4.823690E-04 |
| $a_{12}$ | 1.354300E-05 | -3.322300E-05 | 2.493000E-06 | -1.180000E-06 | 2.270000E-07 |
| $a_{14}$ | 1.309700E-05 | -2.439600E-05 | 1.736000E-06 | -2.830000E-07 | 2.400000E-08 |
| $a_{16}$ | 1.090300E-05 | -1.521300E-05 | 9.730000E-07 | -6.800000E-08 | 4.000000E-09 |

FIG. 37

| Embodiment | 1st | 2nd | 3rd | 4th | 5th | 6th | 7th | 8th |
|---|---|---|---|---|---|---|---|---|
| T1 | 0.689 | 0.603 | 0.720 | 0.705 | 0.708 | 0.700 | 0.603 | 0.706 |
| G12 | 0.147 | 0.161 | 0.149 | 0.149 | 0.142 | 0.149 | 0.170 | 0.151 |
| T2 | 0.241 | 0.285 | 0.254 | 0.249 | 0.250 | 0.248 | 0.275 | 0.242 |
| G23 | 0.247 | 0.237 | 0.204 | 0.240 | 0.245 | 0.245 | 0.239 | 0.249 |
| T3 | 0.332 | 0.351 | 0.335 | 0.336 | 0.337 | 0.334 | 0.384 | 0.336 |
| G34 | 0.486 | 0.469 | 0.489 | 0.486 | 0.488 | 0.487 | 0.472 | 0.485 |
| T4 | 0.708 | 0.670 | 0.700 | 0.698 | 0.718 | 0.698 | 0.643 | 0.690 |
| G45 | 0.268 | 0.223 | 0.274 | 0.275 | 0.264 | 0.272 | 0.216 | 0.276 |
| T5 | 0.778 | 0.695 | 0.780 | 0.779 | 0.783 | 0.776 | 0.686 | 0.779 |
| BFL | 1.297 | 1.342 | 1.298 | 1.299 | 1.300 | 1.288 | 1.347 | 1.300 |
| EFL | 3.973 | 3.660 | 4.109 | 4.123 | 4.112 | 3.981 | 3.600 | 4.127 |
| ALT | 2.748 | 2.604 | 2.789 | 2.768 | 2.795 | 2.755 | 2.591 | 2.754 |
| AAG | 1.147 | 1.091 | 1.117 | 1.151 | 1.139 | 1.154 | 1.096 | 1.161 |
| (T1+T2)/G23 | 3.773 | 3.745 | 4.770 | 3.969 | 3.912 | 3.863 | 3.679 | 3.809 |
| T3/G34 | 0.684 | 0.747 | 0.686 | 0.692 | 0.690 | 0.685 | 0.813 | 0.694 |
| ALT/(G12+G45) | 6.624 | 6.775 | 6.584 | 6.524 | 6.881 | 6.545 | 6.720 | 6.449 |
| AAG/T2 | 4.755 | 3.825 | 4.398 | 4.618 | 4.551 | 4.659 | 3.992 | 4.792 |
| EFL/(T3+T5) | 3.579 | 3.501 | 3.684 | 3.696 | 3.674 | 3.587 | 3.364 | 3.700 |
| (G34+G45)/T2 | 3.123 | 2.428 | 3.006 | 3.054 | 3.003 | 3.068 | 2.506 | 3.140 |
| (T2+T5)/G34 | 2.097 | 2.087 | 2.114 | 2.116 | 2.117 | 2.101 | 2.036 | 2.106 |
| EFL/(T2+T4) | 4.185 | 3.831 | 4.310 | 4.353 | 4.248 | 4.211 | 3.923 | 4.427 |
| AAG/G34 | 2.361 | 2.324 | 2.284 | 2.368 | 2.334 | 2.367 | 2.322 | 2.394 |
| BFL/(G12+G23) | 3.295 | 3.367 | 3.672 | 3.333 | 3.356 | 3.270 | 3.299 | 3.249 |
| (G12+G23)/T2 | 1.631 | 1.397 | 1.392 | 1.564 | 1.548 | 1.591 | 1.487 | 1.652 |
| (T3+T4)/T5 | 1.337 | 1.470 | 1.326 | 1.327 | 1.347 | 1.329 | 1.497 | 1.318 |
| BFL/(T2+T3) | 2.261 | 2.111 | 2.203 | 2.219 | 2.215 | 2.216 | 2.045 | 2.246 |

FIG. 38

MOBILE DEVICE AND OPTICAL IMAGING LENS THEREOF

INCORPORATION BY REFERENCE

This application claims priority from P.R.O.C. Patent Application No. 201510100173.5, filed on Mar. 6, 2015, the contents of which are hereby incorporated by reference in their entirety for all purposes.

TECHNICAL FIELD

The present disclosure relates to a mobile device and an optical imaging lens thereof, and particularly, relates to a mobile device applying an optical imaging lens having five lens elements and an optical imaging lens thereof.

BACKGROUND

The specifications of electrical products for consumers change with each passing day, and a trend for reducing sizes of mobile phones has not declined. As a result, the specifications of critical elements of optical lens must also be upgraded continuously to conform to consumers' demands. The most important characteristics of an optical lens may include its imaging quality and size. About an optical imaging lens comprising five lens elements, a distance between an object-side surface of a first lens element of the optical imaging lens and an imaging plane along an optical axis is longer, so goals of smaller sized mobile phones and digital cameras may not be achieved easily. Therefore, there is a need to develop an optical lens having improved imaging quality and shorter length.

SUMMARY

An object of the present disclosure is to provide a mobile device and an optical imaging lens thereof. With controlling the convex or concave shape of the surfaces, the length of the optical imaging lens may be shortened and while maintaining good optical characteristics and system functionality.

In an exemplary embodiment, an optical imaging lens may comprise, sequentially from an object side to an image side along an optical axis, an aperture stop, first, second, third, fourth, and fifth lens elements, each of the first, second, third, fourth, and fifth lens elements having refracting power, an object-side surface facing toward the object side and an image-side surface facing toward the image side and a central thickness defined along the optical axis.

In the specification, parameters used here include: the central thickness of the first lens element, represented by T1, an air gap between the first lens element and the second lens element along the optical axis, represented by G12, the central thickness of the second lens element, represented by T2, an air gap between the second lens element and the third lens element along the optical axis, represented by G23, the central thickness of the third lens element, represented by T3, an air gap between the third lens element and the fourth lens element along the optical axis, represented by G34, the central thickness of the fourth lens element, represented by T4, an air gap between the fourth lens element and the fifth lens element along the optical axis, represented by G45, the central thickness of the fifth lens element, represented by T5, a distance between the image-side surface of the fifth lens element and the object-side surface of a filtering unit along the optical axis, represented by G5F, the central thickness of the filtering unit along the optical axis, represented by TF, a distance between the image-side surface of the filtering unit and an image plane along the optical axis, represented by GFP, a focusing length of the first lens element, represented by f1, a focusing length of the second lens element, represented by f2, a focusing length of the third lens element, represented by f3, a focusing length of the fourth lens element, represented by f4, a focusing length of the fifth lens element, represented by f5, the refracting index of the first lens element, represented by n1, the refracting index of the second lens element, represented by n2, the refracting index of the third lens element, represented by n3, the refracting index of the fourth lens element, represented by n4, the refracting index of the fifth lens element, represented by n5, an abbe number of the first lens element, represented by v1, an abbe number of the second lens element, represented by v2, an abbe number of the third lens element, represented by v3, an abbe number of the fourth lens element, represented by v4, an abbe number of the fifth lens element, represented by v5, an effective focal length of the optical imaging lens, represented by EFL, a distance between the object-side surface of the first lens element and an image plane along the optical axis, represented by TTL, a sum of the central thicknesses of all five lens elements, i.e. a sum of T1, T2, T3, T4, and T5, represented by ALT, a sum of all four air gaps from the first lens element to the fifth lens element along the optical axis, i.e. a sum of G12, G23, G34, and G45, represented by AAG, a back focal length of the optical imaging lens, which is defined as the distance from the image-side surface of the sixth lens element to the image plane along the optical axis, i.e. a sum of G5F, TF and GFP, and represented by BFL.

In an aspect of the optical imaging lens of the present disclosure, the image-side surface of the first lens element may comprise a convex portion in a vicinity of the periphery of the first lens element; the image-side surface of the second lens element may comprise a concave portion in a vicinity of the periphery of the second lens element, the object-side surface of the third lens element may comprise a convex portion in a vicinity of the periphery of the third lens element, the image-side surface of the third lens element may comprise a concave portion in a vicinity of an optical axis and a concave portion in a vicinity of the periphery of the third lens element; the fourth lens element has positive refracting power, the object-side surface of the fourth lens element may comprise a concave portion in a vicinity of the optical axis and a concave portion in a vicinity of the periphery of the fourth lens element; the image-side surface of the fifth lens element may comprise a concave portion in a vicinity of an optical axis; and the optical imaging lens may comprise no other lenses having refracting power beyond the five lens elements.

In another exemplary embodiment, other equation(s), such as those relating to the ratio among parameters could be taken into consideration. For example, T1, T2 and G23 could be controlled to satisfy the equation as follows:

$$(T1+T2)/G23 \geq 3.65 \qquad \text{Equation (1); or}$$

T3 and G34 could be controlled to satisfy the equation as follows:

$$T3/G34 \leq 1.3 \qquad \text{Equation (2); or}$$

EFL, T2 and T4 could be controlled to satisfy the equation as follows:

$$EFL/(T2+T4) \geq 3.5 \qquad \text{Equation (3); or}$$

ALT, G12 and G45 could be controlled to satisfy the equation as follows:

$ALT/(G12+G45) \leq 10.0$      Equation (4); or

AAG and G34 could be controlled to satisfy the equation as follows:

$AAG/G34 \geq 2.1$      Equation (5); or

AAG and T2 could be controlled to satisfy the equation as follows:

$AAG/T2 \geq 2.9$      Equation (6); or

BFL, G12 and G23 could be controlled to satisfy the equation as follows:

$BFL/(G12+G23) \leq 3.7$      Equation (7); or

EFL, T3 and T5 could be controlled to satisfy the equation as follows:

$EFL/(T3+T5) \geq 3.3$      Equation (8); or

T2, G12 and G23 could be controlled to satisfy the equation as follows:

$(G12+G23)/T2 \geq 1.2$      Equation (9); or

T2, G34 and G45 could be controlled to satisfy the equation as follows:

$(G34+G45)/T2 \geq 2.1$      Equation (10); or

T3, T4 and T5 could be controlled to satisfy the equation as follows:

$(T3+T4)/T5 \leq 2.15$      Equation (11); or

T2, T5 and G34 could be controlled to satisfy the equation as follows:

$(T2+T5)/G34 \leq 2.3$      Equation (12); or

BFL, T2 and T3 could be controlled to satisfy the equation as follows:

$BFL/(T2+T3) \geq 2.0$      Equation (13).

Aforesaid exemplary embodiments are not limited and could be selectively incorporated in other embodiments described herein.

In some exemplary embodiments, more details about the convex or concave surface structure could be incorporated for one specific lens element or broadly for plural lens elements to enhance the control for the system performance and/or resolution. It is noted that the details listed here could be incorporated in example embodiments if no inconsistency occurs.

In another exemplary embodiment, a mobile device comprising a housing and a photography module positioned in the housing is provided. The photography module may comprise any of aforesaid example embodiments of optical imaging lens, a lens barrel, a module housing unit and an image sensor. The lens barrel may be suitable for positioning the optical imaging lens, the module housing unit may be suitable for positioning the lens barrel, and the image sensor may be positioned at the image side of the optical imaging lens.

By controlling the convex or concave shape of the surfaces, the mobile device and the optical imaging lens thereof in exemplary embodiments may achieve good optical characteristics and may effectively shorten the length of an optical imaging lens.

BRIEF DESCRIPTION OF THE DRAWINGS

Exemplary embodiments will be more readily understood from the following detailed description when read in conjunction with the appended drawing, in which:

FIG. 1 is a cross-sectional view of one single lens element according to the present disclosure;

FIG. 2 is a schematic view of the relation between the surface shape and the optical focus of the lens element;

FIG. 8 is a table of optical data for each lens element of the optical imaging lens of a first embodiment of the present disclosure;

FIG. 9 is a table of aspherical data of a first embodiment of the optical imaging lens according to the present disclosure;

FIG. 12 is a table of optical data for each lens element of the optical imaging lens of a second embodiment of the present disclosure;

FIG. 13 is a table of aspherical data of a second embodiment of the optical imaging lens according to the present disclosure;

FIG. 16 is a table of optical data for each lens element of the optical imaging lens of a third embodiment of the present disclosure;

FIG. 17 is a table of aspherical data of a third embodiment of the optical imaging lens according to the present disclosure;

FIG. 20 is a table of optical data for each lens element of the optical imaging lens of a fourth embodiment of the present disclosure;

FIG. 21 is a table of aspherical data of a fourth embodiment of the optical imaging lens according to the present disclosure;

FIG. 24 is a table of optical data for each lens element of the optical imaging lens of a fifth embodiment of the present disclosure;

FIG. 25 is a table of aspherical data of a fifth embodiment of the optical imaging lens according to the present disclosure;

FIG. 28 is a table of optical data for each lens element of a sixth embodiment of an optical imaging lens according to the present disclosure;

FIG. 29 is a table of aspherical data of a sixth embodiment of the optical imaging lens according to the present disclosure;

FIG. 32 is a table of optical data for each lens element of the optical imaging lens of a seventh embodiment of the present disclosure;

FIG. 33 is a table of aspherical data of a seventh embodiment of the optical imaging lens according to the present disclosure;

FIG. 36 is a table of optical data for each lens element of the optical imaging lens of a eighth embodiment of the present disclosure;

FIG. 37 is a table of aspherical data of a eighth embodiment of the optical imaging lens according to the present disclosure;

FIG. 38 is a table for values of T1, G12, T2, G23, T3, G34, T4, T5, BFL, EFL, ALT, AAG, (T1+T2)/G23, T3/G34, ALT/(G12+G45), AAG/T2, EFL/(T3+T5), (G34+G45)/T2, (T2+T5)/G34, EFL/(T2+T4), AAG/G34, EFL/(T2+T4), AAG/G34, BFL/(G12+G23), (G12+G23)/T2, (T3+T4)/T5, and BFL/(T2+T3) for eight embodiments;

DETAILED DESCRIPTION

Figure 4:
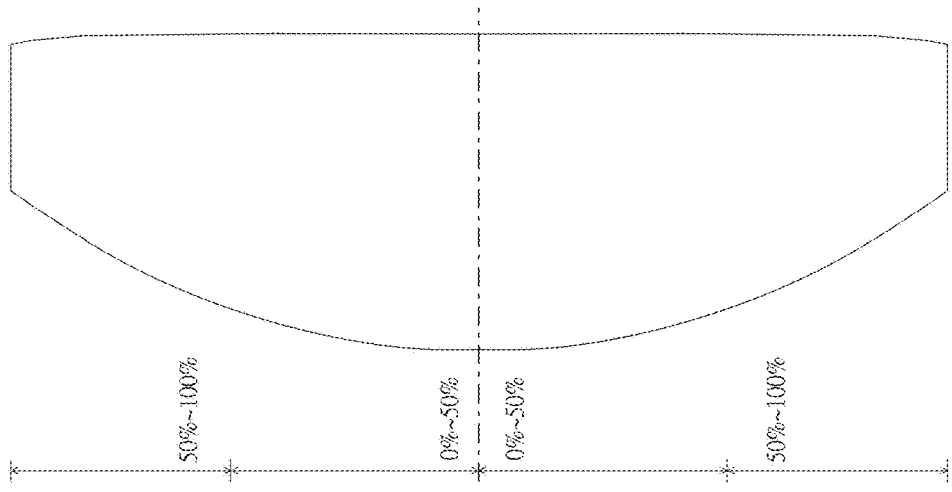
FIG. 4 is a schematic view of a second example of the surface shape and the efficient radius of the lens element.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present specification, the description "a lens element having positive refracting power (or negative refractive power)" may mean that the paraxial refractive power of the lens element in Gaussian optics is positive (or negative). The description "An object-side (or image-side) surface of a lens element" may include only a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element may be rotationally symmetric, where the optical axis I may be the axis of symmetry. The region A of the lens element may be defined as "a part in a vicinity of the optical axis", and the region C of the lens element is defined as "a part in a vicinity of a periphery of the lens element". Besides, the lens element may also have an extending part E extended radially and outwardly from the region C, namely the part outside of the clear aperture of the lens element. The extending part E is usually used for physically assembling the lens element into an optical imaging lens system. Under normal circumstances, the imaging rays would not pass through the extending part E because those imaging rays only pass through the clear aperture. The structures and shapes of the aforementioned extending part E are only examples for technical explanation, the structures and shapes of lens elements should not be limited to these examples. Note that the extending parts of the lens element surfaces depicted in the following embodiments are partially omitted.

The following criteria are provided for determining the shapes and the parts of lens element surfaces set forth in the present specification. These criteria mainly determine the boundaries of parts under various circumstances including the part in a vicinity of the optical axis, the part in a vicinity of a periphery of a lens element surface, and other types of lens element surfaces such as those having multiple parts.

FIG. 1 is a radial cross-sectional view of a lens element. Before determining boundaries of those aforesaid parts, two referential points should be defined first, central point and transition point. The central point of a surface of a lens element may be a point of intersection of that surface and the optical axis. The transition point may be a point on a surface of a lens element, where the tangent line of that point is perpendicular to the optical axis. Additionally, if multiple transition points appear on one single surface, then these transition points may be sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The part of a surface of the lens element between the central point and the first transition point may be defined as the part in a vicinity of the optical axis. The part located radially outside of the Nth transition point (but still within the scope of the clear aperture) may be defined as the part in a vicinity of a periphery of the lens element. In some embodiments, there are other parts existing between the part in a vicinity of the optical axis and the part in a vicinity of a periphery of the lens element; the numbers of parts depend on the numbers of the transition point(s). In addition, the radius of the clear aperture (or a so-called effective radius) of a surface may be defined as the radial distance from the optical axis I to a point of intersection of the marginal ray Lm and the surface of the lens element.

Referring to FIG. 2, determining the shape of a part is convex or concave may depend on whether a collimated ray passing through that part converges or diverges. That is, while applying a collimated ray to a part to be determined in terms of shape, the collimated ray passing through that part may be bendt and the ray itself or its extension line will eventually meet the optical axis. The shape of that part can be determined by whether the ray or its extension line meets (intersects) the optical axis (focal point) at the object-side or image-side. For instance, if the ray itself intersects the optical axis at the image side of the lens element after passing through a part, i.e. the focal point of this ray is at the image side (see point R in FIG. 2), the part may be determined as having a convex shape. On the contrary, if the ray diverges after passing through a part, the extension line of the ray intersects the optical axis at the object side of the lens element, i.e. the focal point of the ray is at the object side (see point M in FIG. 2), that part may be determined as having a concave shape. Therefore, referring to FIG. 2, the part between the central point and the first transition point may have a convex shape, the part located radially outside of the first transition point may have a concave shape, and the first transition point may be the point where the part having a convex shape changes to the part having a concave shape, namely the border of two adjacent parts. Alternatively, there may be another common way for a person with ordinary skill in the art to tell whether a part in a vicinity of the optical axis has a convex or concave shape by referring to the sign of an "R" value, which may be the (paraxial) radius of curvature of a lens surface. The R value may be used in optical design software such as Zemax and CodeV. The R value may appear in the lens data sheet in the software. For an object-side surface, positive R may mean that the object-side surface is convex, and negative R may mean that the object-side surface is concave. Conversely, for an image-side surface, positive R may mean that the image-side surface is concave, and negative R may mean that the image-side surface is convex. The result found by using this method should be consistent as by using the other way mentioned above, which may determine surface shapes by referring to whether the focal point of a collimated ray is at the object side or the image side.

For none transition point cases, the part in a vicinity of the optical axis may be defined as the part between about 0% to about 50% of the effective radius (radius of the clear aperture) of the surface, whereas the part in a vicinity of a periphery of the lens element may be defined as the part between about 50% to about 100% of effective radius (radius of the clear aperture) of the surface.

Figure 3:
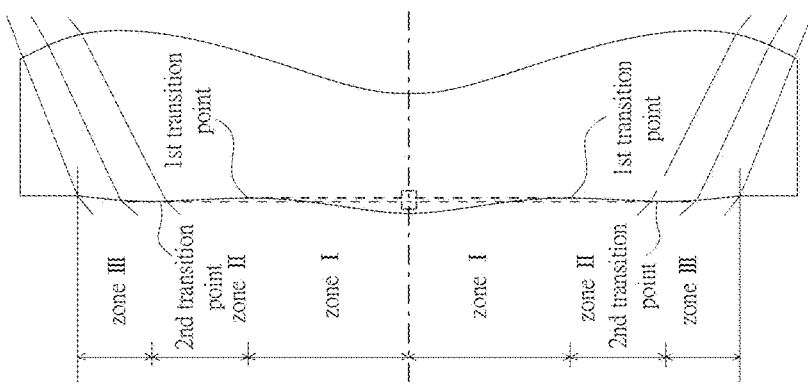
FIG. 3 is a schematic view of a first example of the surface shape and the efficient radius of the lens element.

Referring to the first example depicted in FIG. 3, only one transition point, namely a first transition point, may appear within the clear aperture of the image-side surface of the lens element. Part I may be a part in a vicinity of the optical axis, and part II may be a part in a vicinity of a periphery of the lens element. The part in a vicinity of the optical axis may be determined as having a concave surface due to the R value at the image-side surface of the lens element is positive. The shape of the part in a vicinity of a periphery of the lens element may be different from that of the radially inner adjacent part, i.e. the shape of the part in a vicinity of a periphery of the lens element may be different from the shape of the part in a vicinity of the optical axis; the part in a vicinity of a periphery of the lens element may have a convex shape.

Referring to the second example depicted in FIG. 4, a first transition point and a second transition point may exist on the object-side surface (within the clear aperture) of a lens element. In which part I may be the part in a vicinity of the optical axis, and part III may be the part in a vicinity of a periphery of the lens element. The part in a vicinity of the optical axis may have a convex shape because the R value at the object-side surface of the lens element may be positive. The part in a vicinity of a periphery of the lens element (part III) may have a convex shape. What is more, there may be another part having a concave shape existing between the first and second transition point (part II).

Figure 5:
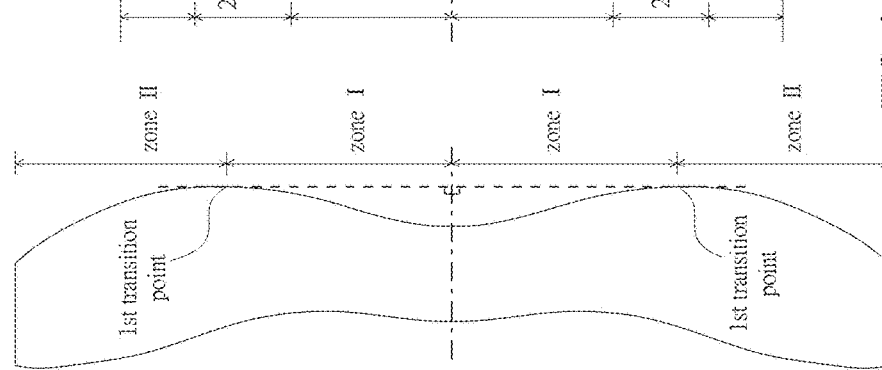
FIG. 5 is a schematic view of a third example of the surface shape and the efficient radius of the lens element.

Referring to a third example depicted in FIG. 5, no transition point may exist on the object-side surface of the lens element. In this case, the part between about 0% to about 50% of the effective radius (radius of the clear aperture) may be determined as the part in a vicinity of the optical axis, and the part between about 50% to about 100% of the effective radius may be determined as the part in a vicinity of a periphery of the lens element. The part in a vicinity of the optical axis of the object-side surface of the lens element may be determined as having a convex shape due to its positive R value, and the part in a vicinity of a periphery of the lens element may be determined as having a convex shape as well.

The first lens element may comprise a image-side surface facing to an image-side, the image-side surface of the first lens element may comprise a convex portion in a vicinity of the periphery of the first lens element, and an aperture stop may be in front of the object-side surface of the first lens element. According to the designs of the first lens element and the aperture stop, collecting light capability can be efficiently enhanced, the length of the optical imaging lens can be shortened.

The second lens element may comprise an image-side surface facing to an image-side, the image-side surface of the second lens element may comprise a concave portion in a vicinity of the periphery of the second lens element. The third lens element may comprise an object-side surface facing to an object-side and an image-side surface facing to an image side, the object-side surface of the third lens element may comprise a convex portion in a vicinity of the periphery of the third lens element. The image-side surface of the third lens element may comprise a concave portion in a vicinity of an optical axis and a concave portion in a vicinity of the periphery of the third lens element. The fourth lens element has positive refracting power, and the object-side surface of the fourth lens element may comprise a concave portion in a vicinity of the optical axis and a concave portion in a vicinity of the periphery of the fourth lens element, the design of the fourth lens element can efficiently amend light's angle and decrease optical aberrations. Besides, the image-side surface of the fifth lens element may comprise a concave portion in a vicinity of the optical axis. The designs of the aperture stop, the first lens element, the second lens element, the third lens element, the fourth lens element, and the fifth lens element may short the length of the optical imaging lens and ensure its imaging quality.

In order to shorten the total length of the optical imaging lens, a designer may have to shorten the thickness of each lens element and the sum of air gaps. When the designer simultaneously considers the assembly difficulty and imaging quality of the optical imaging lens, the arrangement of the optical imaging lens can be further improved if the design of the optical imaging lens can satisfy some equations described below: $(T1+T2)/G23 \geq 3.65$, and in some embodiments the range is between about 3.65 and about 4.80; $T3/G34 \leq 1.3$, and in some embodiments the range is between about 0.6 and about 1.3; $ALT/(G12+G45) \leq 10$, and in some embodiments the range is between about 6.4 and about 10.0; $AAG/T2 \geq 2.9$, and in some embodiments the range is between about 2.9 and about 4.8; $EFL/(T3+T5) \geq 3.3$, and in some embodiments the range is between about 3.3 and about 3.7; $(G34+G45)/T2 \geq 2.1$, and in some embodiments the range is between about 2.1 and about 3.2; $(T2+T5)/G34 \leq 2.3$, and in some embodiments the range is between about 2.0 and about 2.3; $EFL/(T2+T4) \geq 3.5$, and in some embodiments the range is between about 3.5 and about 4.5; $AAG/G34 \geq 2.1$, and in some embodiments the range is between about 2.1 and about 2.4; $BFL/(G12+G23) \leq 3.7$, and in some embodiments the range is between about 3.2 and about 3.7; $(G12+G23)/T2 \geq 1.2$, and in some embodiments the range is between about 1.2 and about 1.7; $(T3+T4)/T5 \leq 2.15$, and in some embodiments the range is between about 1.3 and about 2.15; $BFL/(T2+T3) \geq 2.0$, and in some embodiments the range is between about 2.0 and about 2.3. Via the designs of parameters described above, a designer can develop and manufacture an optical imaging lens having improved imaging quality and shorter length.

When implementing example embodiments, more details about the convex or concave surface could be incorporated for one specific lens element or broadly for plural lens elements to enhance the control for the system performance and/or resolution. It is noted that the details listed here could be incorporated in example embodiments if no inconsistency occurs.

Figure 6:
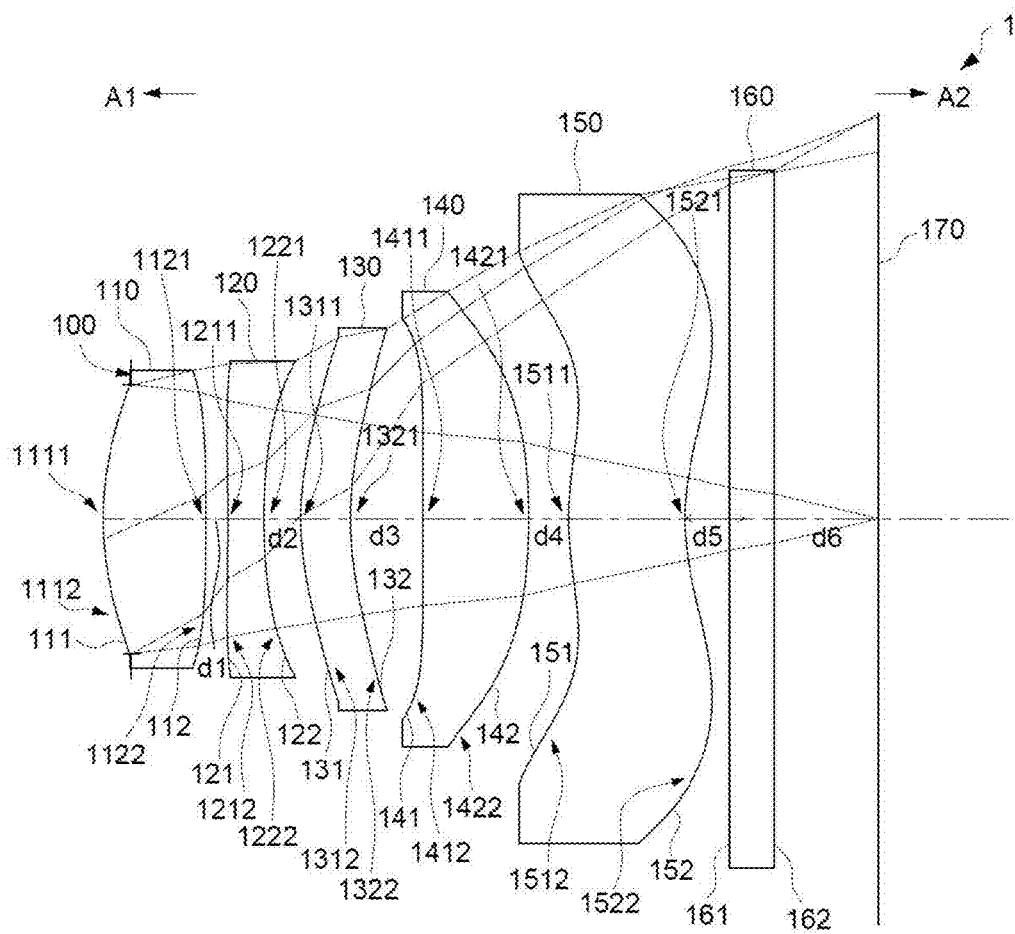
FIG. 6 is a cross-sectional view of a first embodiment of an optical imaging lens having five lens elements according to the present disclosure.
Figure 7:
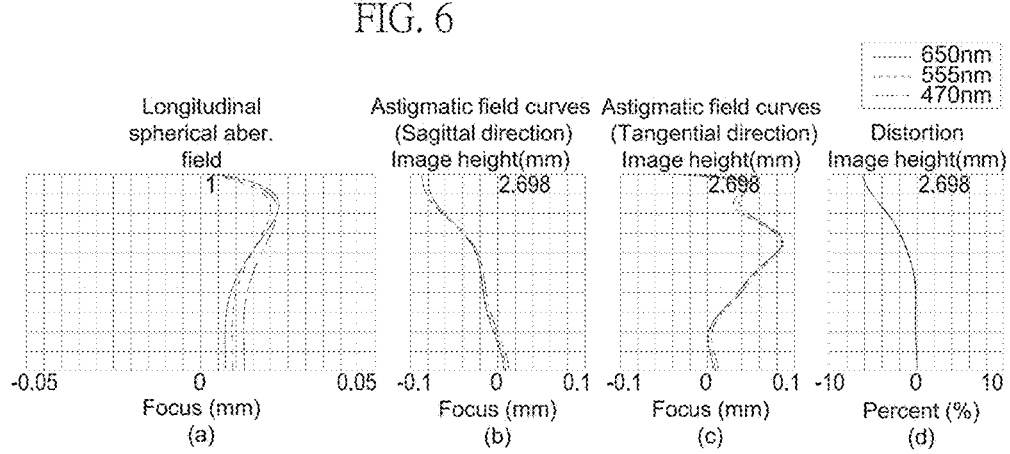
FIG. 7 is a chart of longitudinal spherical aberration and other kinds of optical aberrations of a first embodiment of the optical imaging lens according to the present disclosure.

Several exemplary embodiments and associated optical data will now be provided for illustrating example embodiments of optical imaging lens with good optical characteristics and a shortened length. Reference is now made to FIGS. 6-9. FIG. 6 illustrates an example cross-sectional view of an optical imaging lens 1 having five lens elements of the optical imaging lens according to a first example embodiment. FIG. 7 shows example charts of longitudinal spherical aberration and other kinds of optical aberrations of the optical imaging lens 1 according to an example embodiment. FIG. 8 illustrates an example table of optical data of each lens element of the optical imaging lens 1 according to an example embodiment, in which f is used for representing EFL. FIG. 9 depicts an example table of aspherical data of the optical imaging lens 1 according to an example embodiment.

As shown in FIG. 6, the optical imaging lens 1 of the present embodiment may comprise, in order from an object side A1 to an image side A2 along an optical axis, an aperture stop 100, a first lens element 110, a second lens element 120, a third lens element 130, a fourth lens element 140, and a fifth lens element 150. A filtering unit 160 and an image plane 170 of an image sensor may be positioned at the image side A2 of the optical lens 1. Each of the first, second, third, fourth, and fifth lens elements 110, 120, 130, 140, 150 and the filtering unit 160 may comprise an object-side surface 111/121/131/141/151/161 facing toward the object side A1 and an image-side surface 112/122/132/142/152/162 facing toward the image side A2. The example embodiment of the filtering unit 160 illustrated may be an IR cut filter (infrared cut filter) positioned between the fifth lens element 150 and an image plane 170. The filtering unit 160 may selectively absorb light with specific wavelength from the light passing optical imaging lens 1. For example, IR light may be absorbed, and this may prohibit the IR light which is not seen by human eyes from producing an image on the image plane 170.

Exemplary embodiments of each lens element of the optical imaging lens 1 which may be constructed by plastic material will now be described with reference to the drawings.

An example embodiment of the first lens element 110 may have positive refracting power. The object-side surface 111 may be a convex surface comprising a convex portion 1111 in a vicinity of an optical axis and a convex portion 1112 in a vicinity of a periphery of the first lens element 110. The image-side surface 112 may be a convex surface comprising a convex portion 1121 in a vicinity of the optical axis and a convex portion 1122 in a vicinity of a periphery of the first lens element 110. The object-side surface 111 and the image-side surface 112 may be aspherical surfaces.

An example embodiment of the second lens element 120 may have negative refracting power. The object-side surface 121 may comprise a concave portion 1211 in a vicinity of the optical axis and a convex portion 1212 in a vicinity of a periphery of the second lens element 120. The image-side surface 122 may be a concave surface comprising a concave portion 1221 in a vicinity of the optical axis and a concave portion 1222 in a vicinity of a periphery of the second lens element 120. The object-side surface 121 and the image-side surface 122 may be aspherical surfaces.

An example embodiment of the third lens element 130 may have positive refracting power. The object-side surface 131 may be a convex surface comprising a convex portion 1311 in a vicinity of the optical axis and a convex portion 1312 in a vicinity of a periphery of the third lens element 130. The image-side surface 132 may be a concave surface comprising a concave portion 1321 in a vicinity of the optical axis and a concave portion 1322 in a vicinity of a periphery of the third lens element 130. The object-side surface 131 and the image-side surface 132 may be aspherical surfaces.

An example embodiment of the fourth lens element 140 may have positive refracting power. The object-side surface 141 may be a concave surface comprising a concave portion 1411 in a vicinity of the optical axis and a concave portion 1412 in a vicinity of a periphery of the fourth lens element 140. The image-side surface 142 may be a convex surface comprising a convex portion 1421 in a vicinity of the optical axis and a convex portion 1422 in a vicinity of a periphery of the fourth lens element 140. The object-side surface 141 and the image-side surface 142 may be aspherical surfaces.

An example embodiment of the fifth lens element 150 may have negative refracting power. The object-side surface 151 may comprise a convex portion 1511 in a vicinity of the optical axis and a concave portion 1512 in a vicinity of a periphery of the fifth lens element 150. The image-side surface 152 may comprise a concave portion 1521 in a vicinity of the optical axis and a convex portion 1522 in a vicinity of a periphery of the fifth lens element 150. The object-side surface 151 and the image-side surface 152 may be aspherical surfaces. Therefore, the design of the image-side surface 152 can enhance the imaging quality of the optical imaging lens.

In example embodiments, air gaps may exist between the lens elements 110, 120, 130, 140, 150, the filtering unit 160 and the image plane 170 of the image sensor. For example, FIG. 1 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the fifth lens element 150, the air gap d5 existing between the fifth lens element 150 and the filtering unit 160 and the air gap d6 existing between the filtering unit 160 and the image plane 170 of the image sensor. However, in other embodiments, any of the aforesaid air gaps may or may not exist. For example, the profiles of opposite surfaces of any two adjacent lens elements may correspond to each other, and in such situation, the air gap may not exist. The air gap d1 is denoted by G12, the air gap d2 is denoted by G23, the air gap d3 is denoted by G34, the air gap d4 is denoted by G45, and the sum of d1 d2, d3, and d4 is denoted by Gaa.

FIG. 8 depicts the optical characteristics of each lens elements in the optical imaging lens 1 of the present embodiment, and please refer to FIG. 38 for the values of T1, G12, T2, G23, T3, G34, T4, T5, BFL, EFL, ALT, AAG, (T1+T2)/G23, T3/G34, ALT/(G12+G45), AAG/T2, EFL/(T3+T5), (G34+G45)/T2, (T2+T5)/G34, EFL/(T2+T4), AAG/G34, EFL/(T2+T4), AAG/G34, BFL/(G12+G23), (G12+G23)/T2, (T3+T4)/T5, and BFL/(T2+T3) of the present embodiment.

The distance from the object-side surface 111 of the first lens element 110 to the image plane 170 along the optical axis may be about 5.193 mm, the image height may be about 2.698 mm.

The aspherical surfaces including the object-side surface 111 of the first lens element 110, the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140, the object-side surface 151 and the image side surface 152 of the fifth lens element 150 may all be defined by the following aspherical formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_i$ represents an aspherical coefficient of $i^{th}$ level.

The values of each aspherical parameter are shown in FIG. 9.

FIG. 7(a) shows the longitudinal spherical aberration, wherein the transverse axis of FIG. 7(a) defines the focus, and the lengthwise axis of FIG. 7(a) defines the filed. FIG. 7(b) shows the astigmatism aberration in the sagittal direction, wherein the transverse axis of FIG. 7(b) defines the focus, and the lengthwise axis of FIG. 7(b) defines the image height. FIG. 7(c) shows the astigmatism aberration in the tangential direction, wherein the transverse axis of FIG. 7(c) defines the focus, and the lengthwise axis of FIG. 7(c) defines the image height. FIG. 7(d) shows the variation of the distortion aberration, wherein the transverse axis of FIG. 7(d) defines the percentage, and the lengthwise axis of FIG. 7(d) defines the image height. The three curves with different wavelengths (470 nm, 555 nm, 650 nm) represent that off-axis light with respect to these wavelengths is focused around an image point. From the vertical deviation of each curve shown in FIG. 7(a), the offset of the off-axis light relative to the image point may be within about ±0.025 mm. Therefore, the first embodiment indeed improves the longitudinal spherical aberration with respect to different wavelengths.

Referring to FIG. 7(b), the focus variation with respect to the three different wavelengths (470 nm, 555 nm, 650 nm) in the whole field may fall within about ±0.1 mm. Referring to FIG. 7(c), the focus variation with respect to the three different wavelengths (470 nm, 555 nm, 650 nm) in the whole field may fall within about ±0.1 mm. Please refer to FIG. 7(d), the transverse axis of FIG. 7(d), the variation of the distortion aberration may be within about ±8%.

Figure 10:
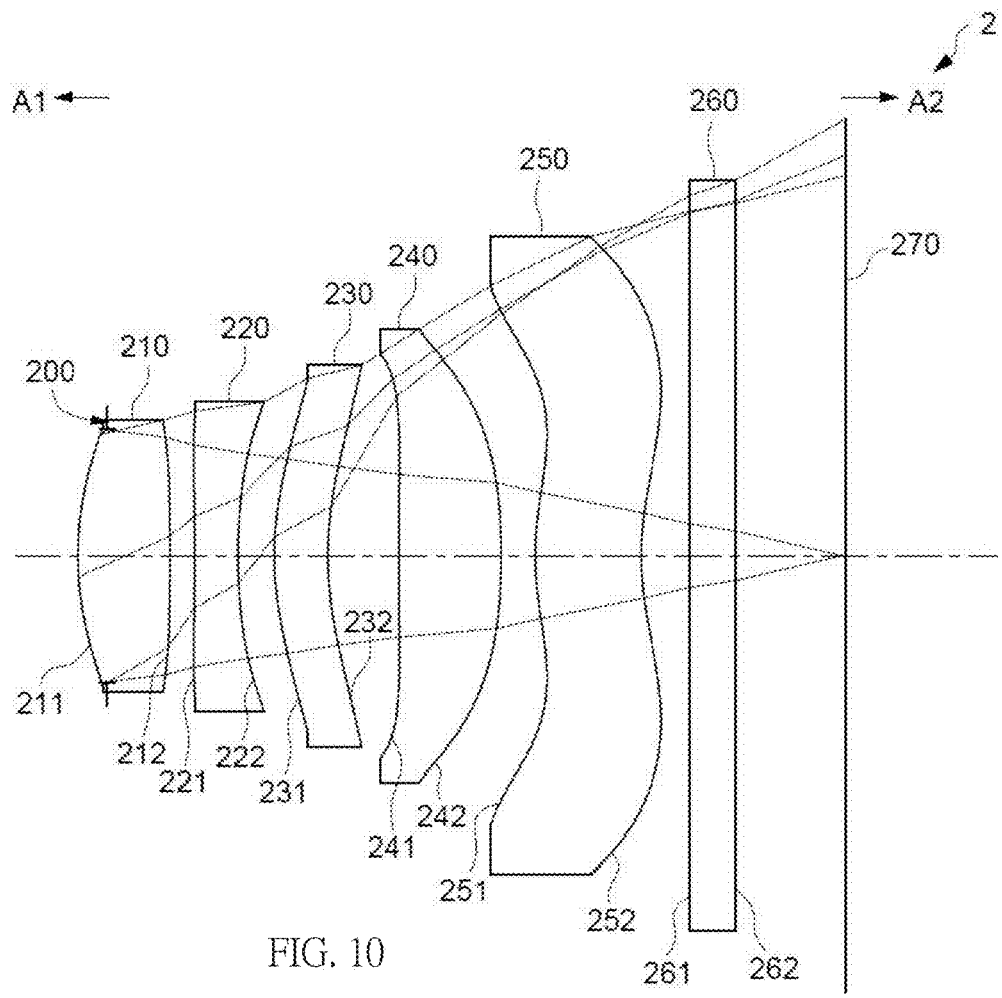
FIG. 10 is a cross-sectional view of a second embodiment of an optical imaging lens having five lens elements according to the present disclosure.
Figure 11:
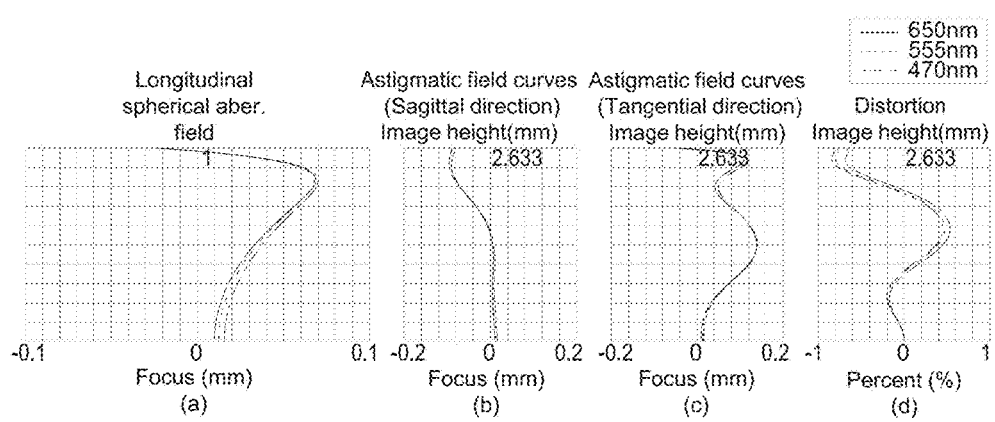
FIG. 11 is a chart of longitudinal spherical aberration and other kinds of optical aberrations of a second embodiment of the optical imaging lens according the present disclosure.

Reference is now made to FIGS. 10-13. FIG. 10 illustrates an example cross-sectional view of an optical imaging lens 2 having five lens elements of the optical imaging lens according to a second example embodiment. FIG. 11 shows example charts of longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 10, the optical imaging lens 2 of the present embodiment, in an order from an object side A1 to an image side A2 along an optical axis, may comprise an aperture stop 200, a first lens element 210, a second lens element 220, a third lens element 230, a fourth lens element 240, and a fifth lens element 250.

The differences between the second embodiment and the first embodiment may include the radius of curvature and thickness of each lens element, the refracting power, the aspherical data, or the total length, but the configuration of the positive/negative refracting power of the first, second, third, and fourth, lens elements 210, 220, 230, 240 and configuration of the concave/convex shape of the object-side surfaces 211, 221, 231, 241, 251 facing to the object side A1 and the image-side surfaces 212, 222, 232, 242, 252 facing to the image side A2 may be similar to those in the first embodiment. Here, for clearly showing the drawings of the present embodiment, only the surface shapes which are different from that in the first embodiment are labeled. Specifically, the fifth lens element has positive refracting power. Please refer to FIG. 12 for the optical characteristics of each lens elements in the optical imaging lens 2 the present embodiment, and please refer to FIG. 38 for the values of T1, G12, T2, G23, T3, G34, T4, T5, BFL, EFL, ALT, AAG, (T1+T2)/G23, T3/G34, ALT/(G12+G45), AAG/T2, EFL/(T3+T5), (G34+G45)/T2, (T2+T5)/G34, EFL/(T2+T4), AAG/G34, EFL/(T2+T4), AAG/G34, BFL/(G12+G23), (G12+G23)/T2, (T3+T4)/T5, and BFL/(T2+T3) of the present embodiment. The distance from the object-side surface 211 of the first lens element 210 to the image plane 270 along the optical axis may be about 5.037 mm, and the image height may be about 2.633 mm.

From the vertical deviation of each curve shown in FIG. 11(a), the offset of the off-axis light relative to the image point may be within about ±0.07 mm. Referring to FIG. 11(b), the focus variation with respect to the three different wavelengths (470 nm, 555 nm, 650 nm) in the whole field may fall within about ±0.12 mm. Referring to FIG. 11(c), the focus variation with respect to the three different wavelengths (470 nm, 555 nm, 650 nm) in the whole field may fall within about +0.16 mm. Refer to FIG. 11(d), the variation of the distortion aberration of the optical imaging lens 2 may be within about ±1%.

Comparing with the first embodiment, the total length of the second embodiment is shorter and is manufactured more easily.

Figure 14:
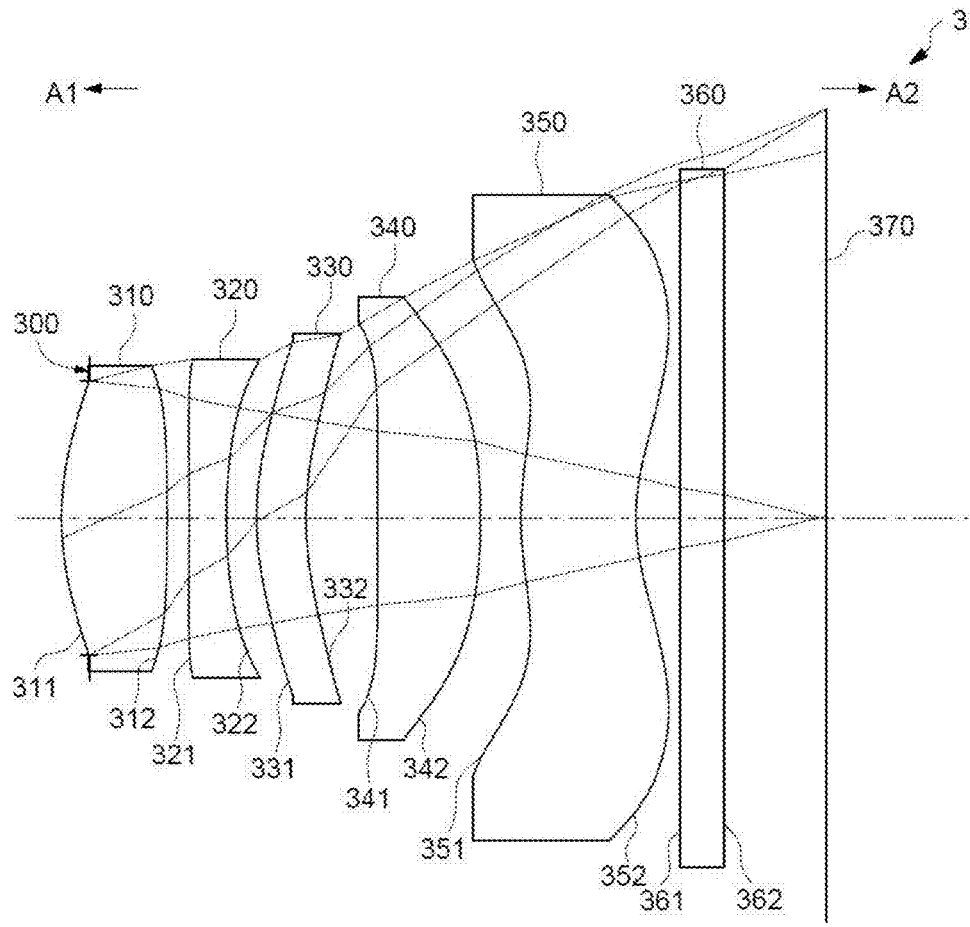
FIG. 14 is a cross-sectional view of a third embodiment of an optical imaging lens having five lens elements according to the present disclosure.
Figure 15:
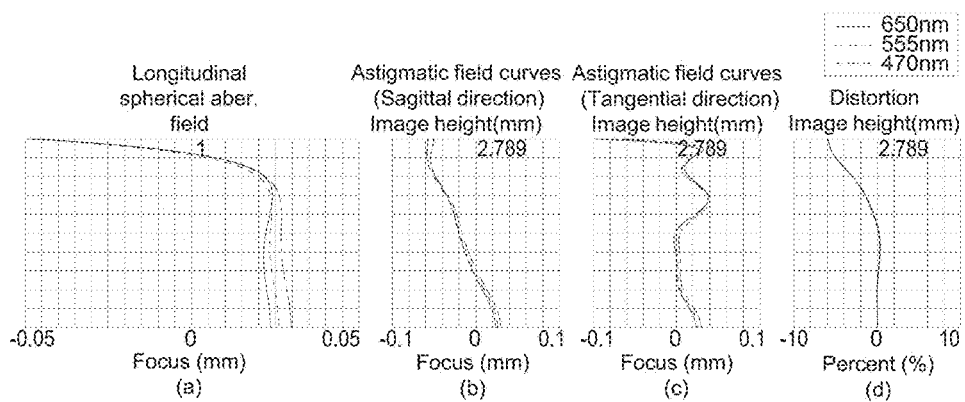
FIG. 15 is a chart of longitudinal spherical aberration and other kinds of optical aberrations of a third embodiment of the optical imaging lens according the present disclosure.

Reference is now made to FIGS. 14-17. FIG. 14 illustrates an example cross-sectional view of an optical imaging lens 3 having five lens elements of the optical imaging lens 3 according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 14, the optical imaging lens 3 of the present embodiment, in an order from an object side A1 to an image side A2 along an optical axis, may comprise an aperture stop 300, a first lens element 310, a second lens element 320, a third lens element 330, a fourth lens element 340, and a fifth lens element 350.

The differences between the third embodiment and the first embodiment may include the radius of curvature and thickness of each lens element, the aspherical data, or the total length, but the configuration of the concave/convex shape of the object-side surfaces 311, 321, 331, 341, 351 facing to the object side A1 and the image-side surfaces 312, 322, 332, 342, 352 facing to the image side A2 may be similar to those in the first embodiment. FIG. 16 depicts the optical characteristics of each lens elements in the optical imaging lens 3 of the present embodiment, and please refer to FIG. 38 for the values of T1, G12, T2, G23, T3, G34, T4, T5, BFL, EFL, ALT, AAG, (T1+T2)/G23, T3/G34, ALT/(G12+G45), AAG/T2, EFL/(T3+T5), (G34+G45)/T2, (T2+T5)/G34, EFL/(T2+T4), AAG/G34, EFL/(T2+T4), AAG/G34, BFL/(G12+G23), (G12+G23)/T2, (T3+T4)/T5, and BFL/(T2+T3) of the present embodiment.

The distance from the object-side surface 311 of the first lens element 310 to the image plane 370 along the optical axis may be about 5.204 mm, the image height may be about 2.789 mm.

From the vertical deviation of each curve shown in FIG. 15(a), the offset of the off-axis light relative to the image point may be within about ±0.05 mm. Referring to FIG. 15(b), the focus variation with respect to the three different wavelengths (470 nm, 555 nm, 650 nm) in the whole field may fall within about ±0.06 mm. Referring to FIG. 15(c), the focus variation with respect to the three different wavelengths (470 nm, 555 nm, 650 nm) in the whole field may fall within about ±0.1 mm. Please refer to FIG. 15(d), the variation of the distortion aberration of the optical imaging lens 3 may be within about ±6%.

Comparing with the first embodiment, the astigmatism aberration in the sagittal direction and the variation of the distortion aberration are smaller.

Figure 18:
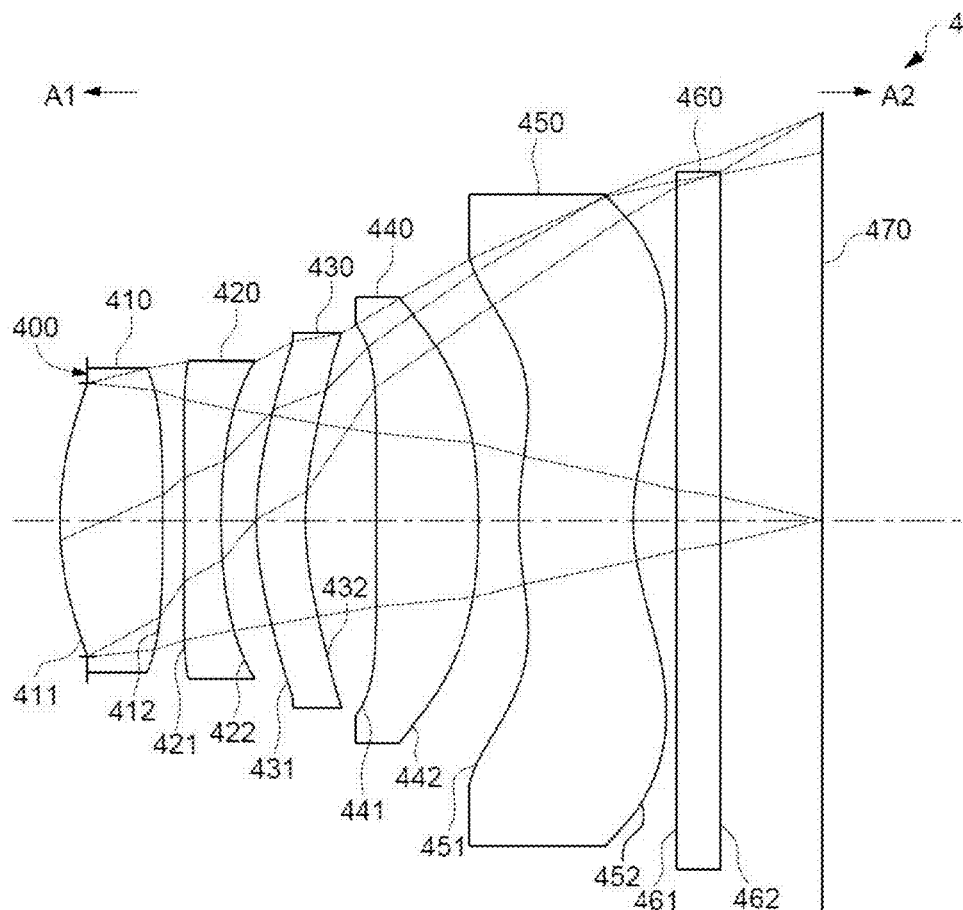
FIG. 18 is a cross-sectional view of a fourth embodiment of an optical imaging lens having five lens elements according to the present disclosure.
Figure 19:
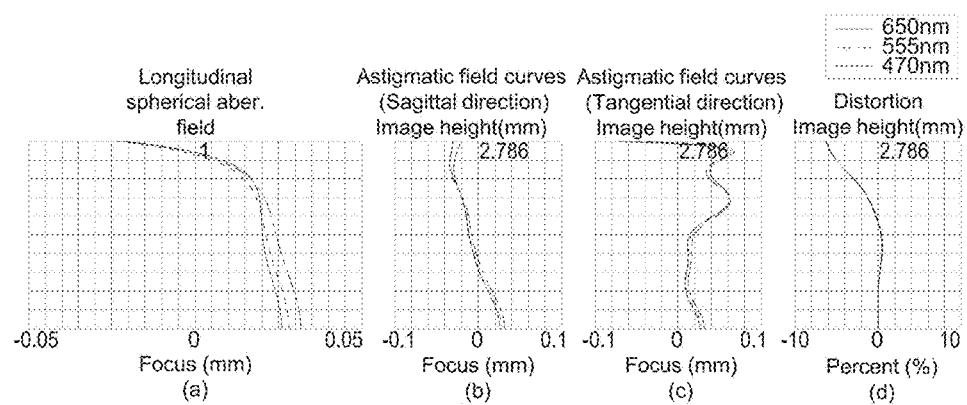
FIG. 19 is a chart of longitudinal spherical aberration and other kinds of optical aberrations of a fourth embodiment of the optical imaging lens according the present disclosure.

Reference is now made to FIGS. 18-21. FIG. 18 illustrates an example cross-sectional view of an optical imaging lens 4 having five lens elements of the optical imaging lens 4 according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 18, the optical imaging lens 4 of the present embodiment, in an order from an object side A1 to an image side A2 along an optical axis, may comprise an aperture stop 400, a first lens element 410, a second lens element 420, a third lens element 430, a fourth lens element 44, and a fifth lens element 450.

The differences between the fourth embodiment and the first embodiment may include the radius of curvature and thickness of each lens element, the aspherical data, or total length, but the configuration of the concave/convex shape of surfaces, comprising the object-side surfaces 411, 421, 431, 441, 451 facing to the object side A1 and the image-side surfaces 412, 422, 432, 442, 452 facing to the image side A2 may be similar to those in the first embodiment. FIG. 20 depicts the optical characteristics of each lens elements in the optical imaging lens 4 of the present embodiment, and please refer to FIG. 38 for the values of T1, G12, T2, G23, T3, G34, T4, T5, BFL, EFL, ALT, AAG, (T1+T2)/G23, T3/G34, ALT/(G12+G45), AAG/T2, EFL/(T3+T5), (G34+G45)/T2, (T2+T5)/G34, EFL/(T2+T4), AAG/G34, EFL/(T2+T4), AAG/G34, BFL/(G12+G23), (G12+G23)/T2, (T3+T4)/T5, and BFL/(T2+T3) of the present embodiment.

The distance from the object-side surface 411 of the first lens element 410 to the image plane 470 along the optical axis may be about 5.217 mm, image height may be about 2.786 mm.

From the vertical deviation of each curve shown in FIG. 19(a), the offset of the off-axis light relative to the image point may be within about ±0.035 mm.

Referring to FIG. 19(b), the focus variation with respect to the three different wavelengths (470 nm, 555 nm, 650 nm)

in the whole field may fall within about ±0.04 mm. Referring to FIG. 19(c), the focus variation with respect to the three different wavelengths (470 nm, 555 nm, 650 nm) in the whole field may fall within about ±0.08 mm. Please refer to FIG. 19(d), the variation of the distortion aberration of the optical imaging lens 4 may be within about ±8%.

Comparing with the first embodiment, the astigmatism aberration in the sagittal direction, and the astigmatism aberration in the tangential direction are smaller.

Figure 22:
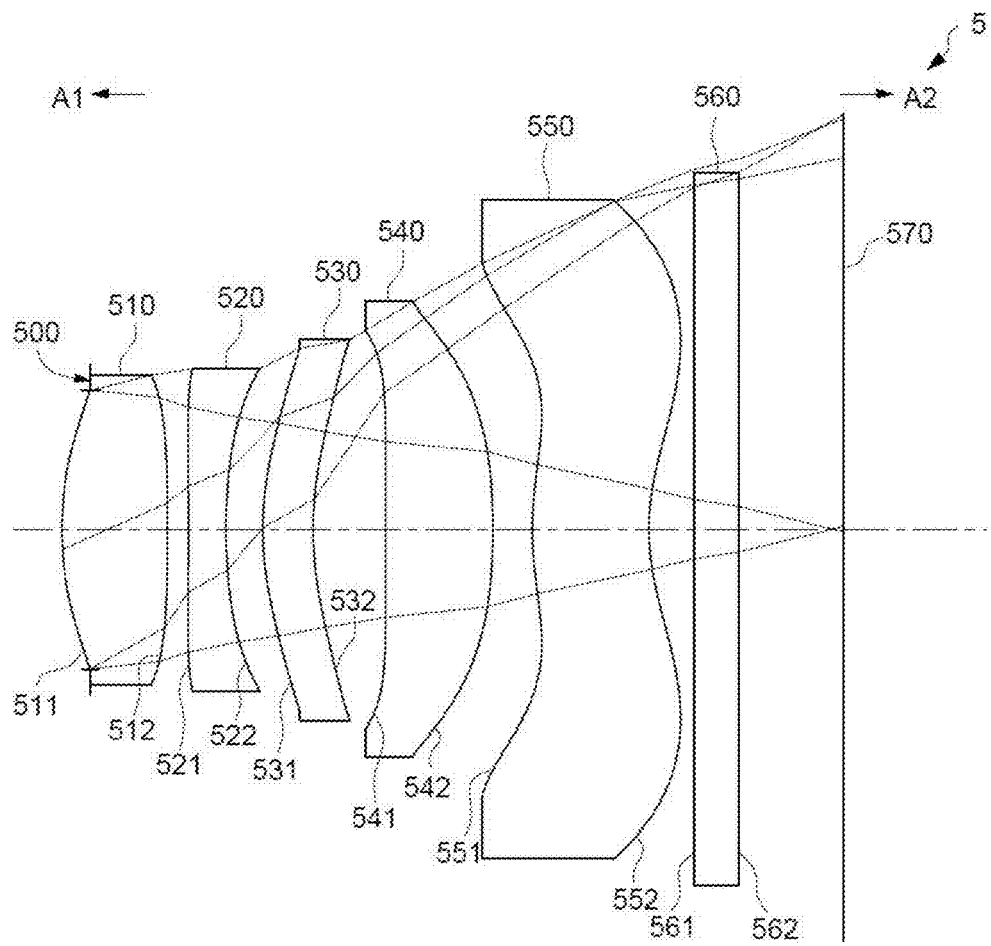
FIG. 22 is a cross-sectional view of a fifth embodiment of an optical imaging lens having five lens elements according to the present disclosure.
Figure 23:
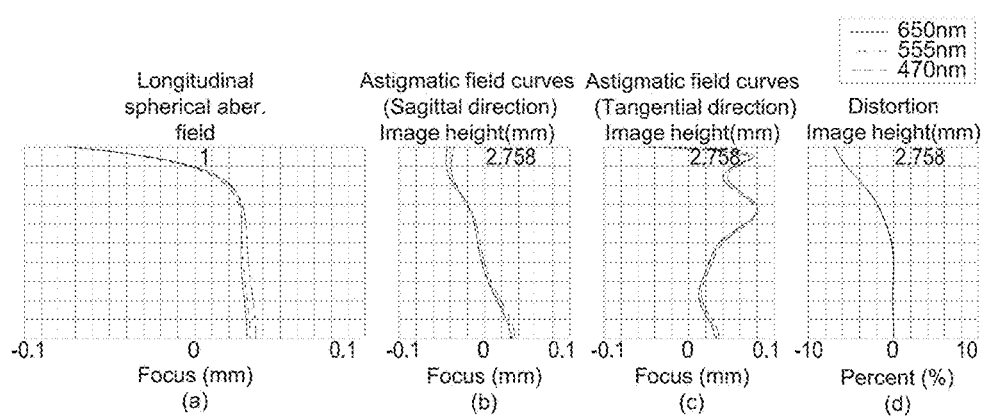
FIG. 23 is a chart of longitudinal spherical aberration and other kinds of optical aberrations of a fifth embodiment of the optical imaging lens according the present disclosure.

Reference is now made to FIGS. 22-25. FIG. 22 illustrates an example cross-sectional view of an optical imaging lens 5 having five lens elements of the optical imaging lens according to a fifth example embodiment. FIG. 23 shows example charts of longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 22, the optical imaging lens 5 of the present embodiment, in an order from an object side A1 to an image side A2 along an optical axis, may comprise an aperture stop 500, a first lens element 510, a second lens element 520, a third lens element 530, a fourth lens element 540, and a fifth lens element 550.

The differences between the fifth embodiment and the first embodiment may include the radius of curvature and thickness of each lens element, the aspherical data, or total length, but the configuration of the concave/convex shape of the object-side surfaces 511, 521, 531, 541, 551 facing to the object side A1 and the image-side surfaces 512, 522, 532, 542, 552 facing to the image side A2 may be similar to those in the first embodiment.

FIG. 24 depicts the optical characteristics of each lens elements in the optical imaging lens 5 of the present embodiment, and please refer to FIG. 38 for the values of T1, G12, T2, G23, T3, G34, T4, T5, BFL, EFL, ALT, AAG, (T1+T2)/G23, T3/G34, ALT/(G12+G45), AAG/T2, EFL/(T3+T5), (G34+G45)/T2, (T2+T5)/G34, EFL/(T2+T4), AAG/G34, EFL/(T2+T4), AAG/G34, BFL/(G12+G23), (G12+G23)/T2, (T3+T4)/T5, and BFL/(T2+T3) of the present embodiment.

The distance from the object-side surface 511 of the first lens element 510 to the image plane 570 along the optical axis may be about 5.234 mm, the image height may be about 2.758 mm.

From the vertical deviation of each curve shown in FIG. 23(a), the offset of the off-axis light relative to the image point may be within about ±0.08 mm.

Referring to FIG. 23(b), the focus variation with respect to the three different wavelengths (470 nm, 555 nm, 650 nm) in the whole field may fall within about +0.06 mm. Referring to FIG. 23(c), the focus variation with respect to the three different wavelengths (470 nm, 555 nm, 650 nm) in the whole field may fall within about ±0.09 mm. Please refer to FIG. 23(d), the variation of the distortion aberration of the optical imaging lens 5 may be within about ±8%.

Comparing with the first embodiment, the astigmatism aberration in the sagittal direction, and the astigmatism aberration in the tangential direction are smaller.

Figure 26:
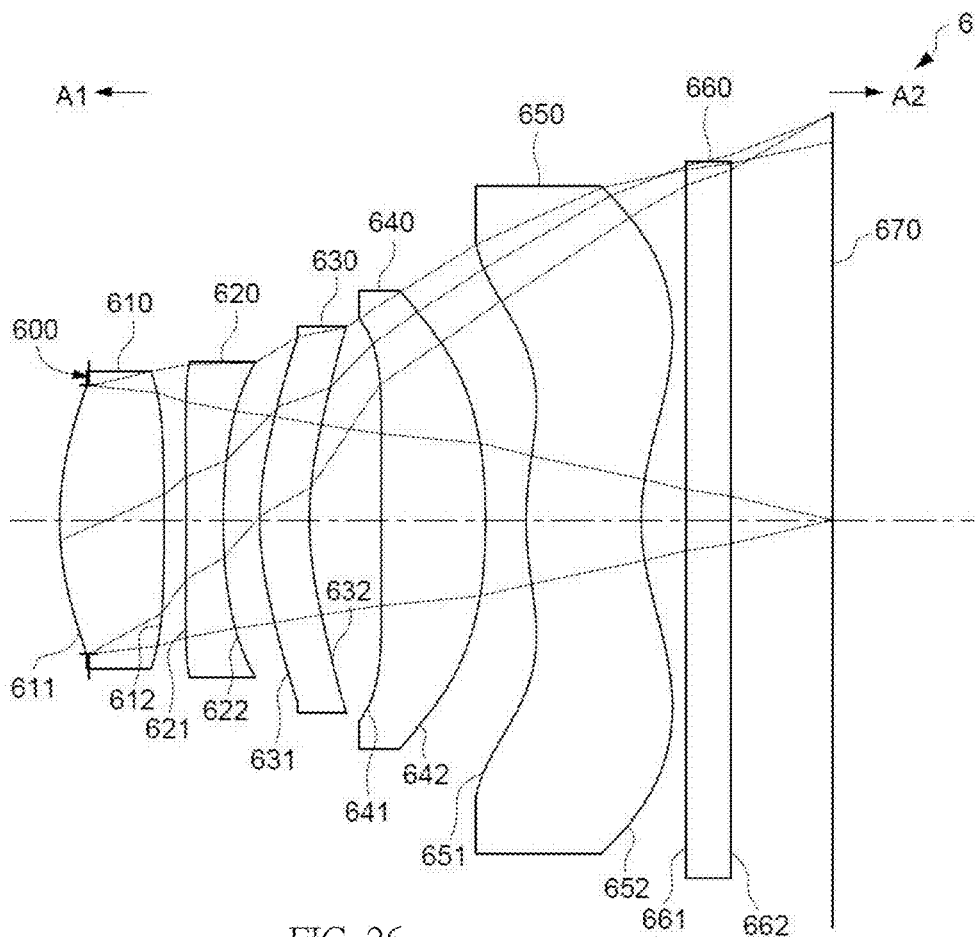
FIG. 26 is a cross-sectional view of a sixth embodiment of an optical imaging lens having five lens elements according to the present disclosure.
Figure 27:
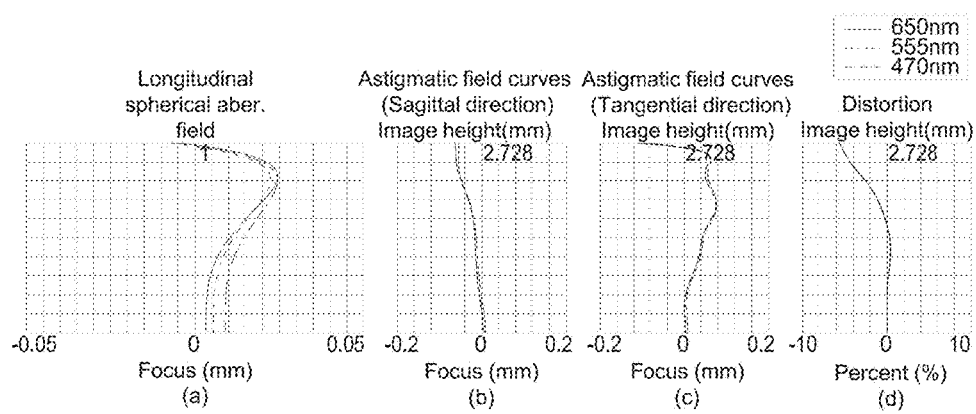
FIG. 27 is a chart of longitudinal spherical aberration and other kinds of optical aberrations of a sixth embodiment of the optical imaging lens according to the present disclosure.

Reference is now made to FIGS. 26-29. FIG. 26 illustrates an example cross-sectional view of an optical imaging lens 6 having five lens elements of the optical imaging lens according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 26, the optical imaging lens 6 of the present embodiment, in an order from an object side A1 to an image side A2 along an optical axis, may comprise an aperture stop 600, a first lens element 610, a second lens element 620, a third lens element 630, a fourth lens element 640, and a fifth lens element 650.

The differences between the sixth embodiment and the first embodiment may include the radius of curvature and thickness of each lens element, the aspherical data, or total length, but the configuration of the concave/convex shape of the object-side surfaces 611, 621, 631, 641, 651 facing to the object side A1 and the image-side surfaces 612, 622, 632, 642, 652 facing to the image side A2 may be similar to those in the first embodiment.

FIG. 28 depicts the optical characteristics of each lens elements in the optical imaging lens 6 of the present embodiment, and please refer to FIG. 38 for the values of T1, G12, T2, G23, T3, G34, T4, T5, BFL, EFL, ALT, AAG, (T1+T2)/G23, T3/G34, ALT/(G12+G45), AAG/T2, EFL/(T3+T5), (G34+G45)/T2, (T2+T5)/G34, EFL/(T2+T4), AAG/G34, EFL/(T2+T4), AAG/G34, BFL/(G12+G23), (G12+G23)/T2, (T3+T4)/T5, and BFL/(T2+T3) of the present embodiment.

The distance from the object-side surface 611 of the first lens element 610 to the image plane 670 along the optical axis is 5.197 mm, and the image height is 2.728 mm.

From the vertical deviation of each curve shown in FIG. 27(a), the offset of the off-axis light relative to the image point may be within about ±0.025 mm.

Referring to FIG. 27(b), the focus variation with respect to the three different wavelengths (470 nm, 555 nm, 650 nm) in the whole field may fall within about ±0.025 mm. Referring to FIG. 23(c), the focus variation with respect to the three different wavelengths (470 nm, 555 nm, 650 nm) in the whole field may fall within about ±0.08 mm. Please refer to FIG. 27(d), the variation of the distortion aberration of the optical imaging lens 6 may be within about ±6%.

Comparing with the first embodiment, the astigmatism aberration in the sagittal direction, and the variation of the distortion aberration are smaller.

Figure 30:
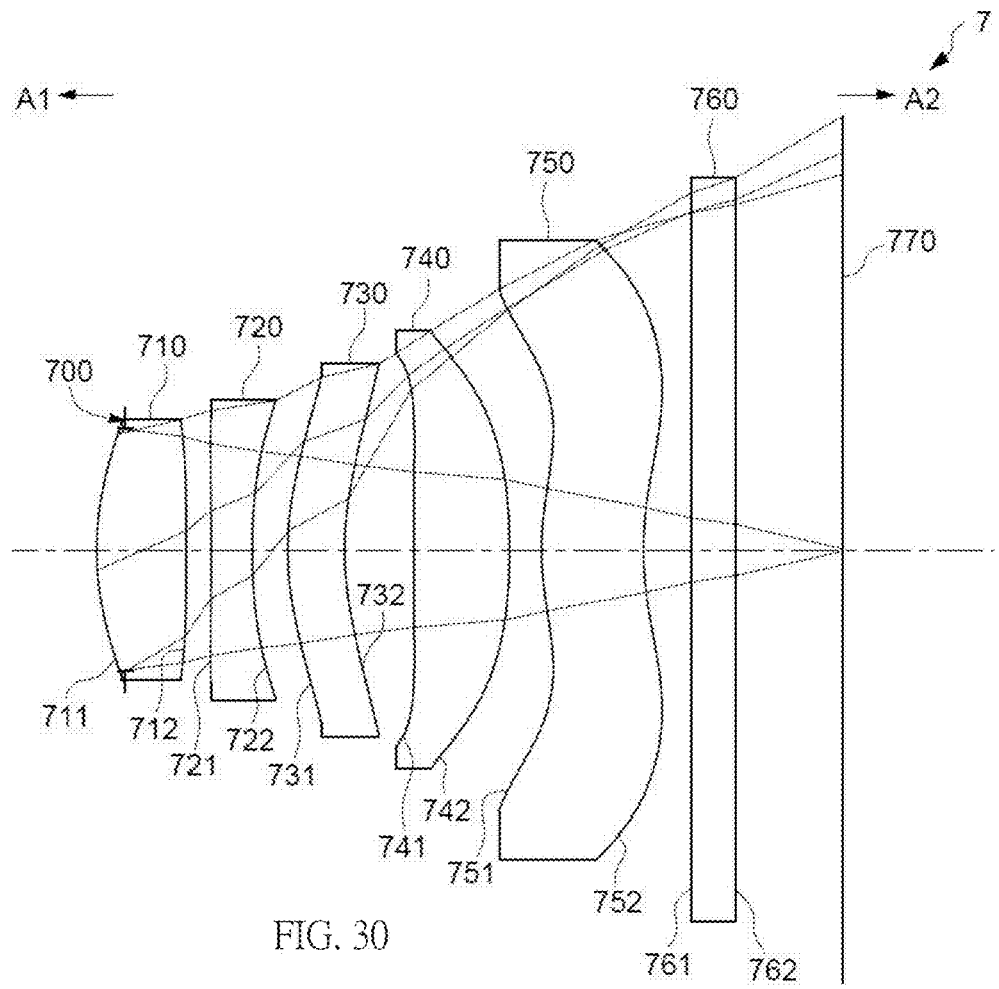
FIG. 30 is a cross-sectional view of a seventh embodiment of an optical imaging lens having five lens elements according to the present disclosure.
Figure 31:
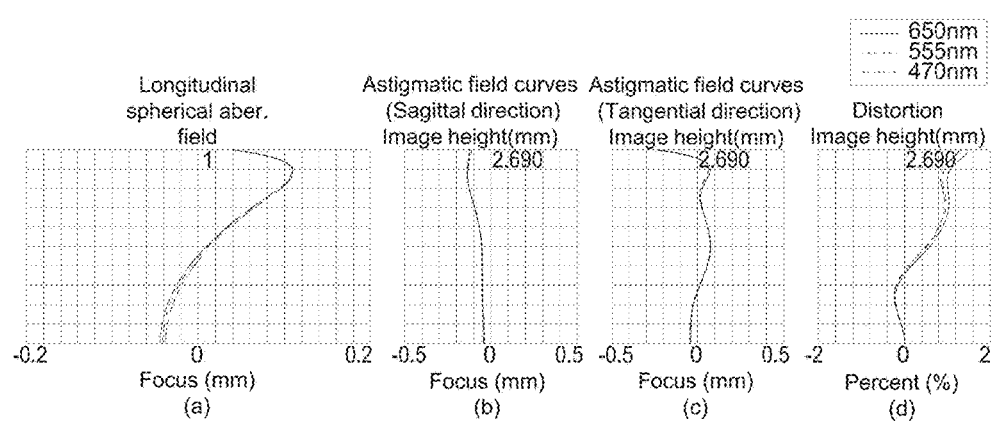
FIG. 31 is a chart of longitudinal spherical aberration and other kinds of optical aberrations of a seventh embodiment of the optical imaging lens according to the present disclosure.

Reference is now made to FIGS. 30-33. FIG. 30 illustrates an example cross-sectional view of an optical imaging lens 7 having five lens elements of the optical imaging lens according to a seventh example embodiment. FIG. 31 shows example charts of longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 30, the optical imaging lens 7 of the present embodiment, in an order from an object side A1 to an image side A2 along an optical axis, may comprise an aperture stop 700, a first lens element 710, a second lens element 720, a third lens element 730, a fourth lens element 740, and a fifth lens element 750.

The differences between the seventh embodiment and the first embodiment may include the radius of curvature, thickness of each lens element, the aspherical data, or total length, but the configuration of the concave/convex shape of the object-side surfaces 711, 721, 731, 741, 751 facing to the object side A1 and the image-side surfaces 712, 722, 732, 742, 752 facing to the image side A2 may be similar to those in the first embodiment. FIG. 32 depicts the optical characteristics of each lens elements in the optical imaging lens 1 of the present embodiment, and please refer to FIG. 38 for the values of T1, G12, T2, G23, T3, G34, T4, T5, BFL, EFL, ALT, AAG, (T1+T2)/G23, T3/G34, ALT/(G12+G45), AAG/T2, EFL/(T3+T5), (G34+G45)/T2, (T2+T5)/G34, EFL/(T2+T4), AAG/G34, EFL/(T2+T4), AAG/G34, BFL/(G12+G23), (G12+G23)/T2, (T3+T4)/T5, and BFL/(T2+T3) of the present embodiment.

The distance from the object-side surface 711 of the first lens element 710 to the image plane 770 along the optical axis may be about 5.035 mm, the image height may be about 2.690 mm.

From the vertical deviation of each curve shown in FIG. 31(a), the offset of the off-axis light relative to the image point may be within about ±0.12 mm.

Referring to FIG. 31(b), the focus variation with respect to the three different wavelengths (470 nm, 555 nm, 650 nm) in the whole field may fall within about ±0.2 mm. Referring to FIG. 31(c), the focus variation with respect to the three different wavelengths (470 nm, 555 nm, 650 nm) in the whole field may fall within about ±0.3 mm. Please refer to FIG. 31(d), the variation of the distortion aberration of the optical imaging lens 7 may be within about ±1.6%.

Comparing with the first embodiment, the total length is shorter and the variation of the distortion aberration is small. Furthermore, the seventh embodiment of the optical imaging lens is manufactured more easily.

Figure 34:
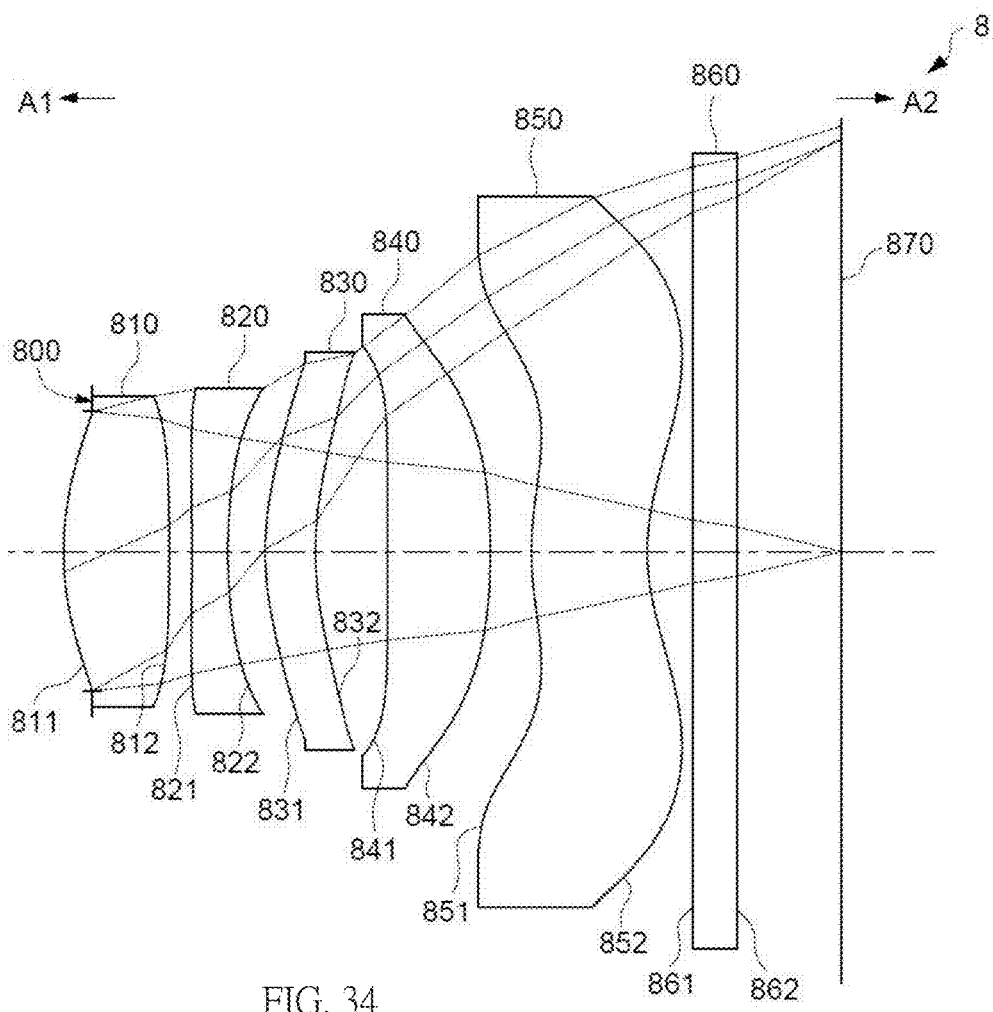
FIG. 34 is a cross-sectional view of a eighth embodiment of an optical imaging lens having five lens elements according to the present disclosure.
Figure 35:
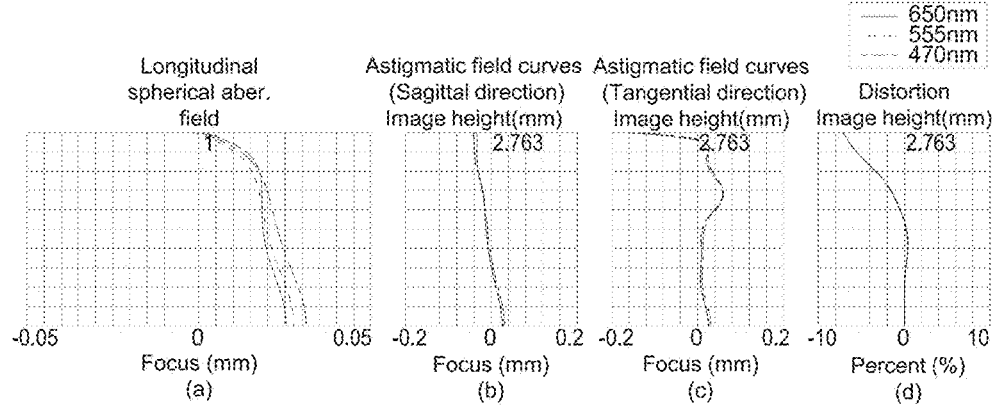
FIG. 35 is a chart of longitudinal spherical aberration and other kinds of optical aberrations of a eighth embodiment of the optical imaging lens according the present disclosure.

Reference is now made to FIGS. 34-37. FIG. 34 illustrates an example cross-sectional view of an optical imaging lens 8 having five lens elements of the optical imaging lens according to an eighth example embodiment. FIG. 35 shows example charts of longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 34, the optical imaging lens 8 of the present embodiment, in an order from an object side A1 to an image side A2 along an optical axis, may comprise an aperture stop 800, a first lens element 810, a second lens element 820, a third lens element 830, a fourth lens element 840, and a fifth lens element 850.

The differences between the eighth embodiment and the first embodiment may include the radius of curvature and thickness of each lens element, the aspherical data, or total length, but the configuration of the concave/convex shape of the object-side surfaces 811, 821, 831, 841, 851 facing to the object side A1 and the image-side surfaces 812, 822, 832, 842, 852 facing to the image side A2 may be similar to those in the first embodiment.

FIG. 36 depicts the optical characteristics of each lens elements in the optical imaging lens 8 of the present embodiment, and please refer to FIG. 38 for the values of T1, G12, T2, G23, T3, G34, T4, T5, BFL, EFL, ALT, AAG, (T1+T2)/G23, T3/G34, ALT/(G12+G45), AAG/T2, EFL/(T3+T5), (G34+G45)/T2, (T2+T5)/G34, EFL/(T2+T4), AAG/G34, EFL/(T2+T4), AAG/G34, BFL/(G12+G23), (G12+G23)/T2, (T3+T4)/T5, and BFL/(T2+T3) of the present embodiment.

The distance from the object-side surface 811 of the first lens element 810 to the image plane 870 along the optical axis may be about 5.215 mm, the image height may be about 2.763 mm.

FIG. 35(a) shows the longitudinal spherical aberration. From the vertical deviation of each curve shown in FIG. 35(a), the offset of the off-axis light relative to the image point may be within about ±0.035 mm.

FIGS. 35(b) and 35(c) respectively show the astigmatism aberration in the sagittal direction and astigmatism aberration in the tangential direction. Referring to FIG. 35(b), the focus variation with respect to the three different wavelengths (470 nm, 555 nm, 650 nm) in the whole field may fall within about ±0.06 mm. Referring to FIG. 35(c), the focus variation with respect to the three different wavelengths (470 nm, 555 nm, 650 nm) in the whole field may fall within about ±0.16 mm. Please refer to FIG. 35(d), the variation of the distortion aberration of the optical imaging lens 8 may be within about ±8%.

Comparing with the first embodiment, the astigmatism aberration in the sagittal direction is smaller and the eighth embodiment of the optical imaging lens is manufactured more easily.

Please refer to FIG. 38 for the values of T1, G12, T2, G23, T3, G34, T4, T5, BFL, EFL, ALT, AAG, (T1+T2)/G23, T3/G34, ALT/(G12+G45), AAG/T2, EFL/(T3+T5), (G34+G45)/T2, (T2+T5)/G34, EFL/(T2+T4), AAG/G34, EFL/(T2+T4), AAG/G34, BFL/(G12+G23), (G12+G23)/T2, (T3+T4)/T5, and BFL/(T2+T3) of all eight embodiments, and it is clear that the optical imaging lens of the present disclosure satisfy the Equations (1)~(13).

Figure 39:
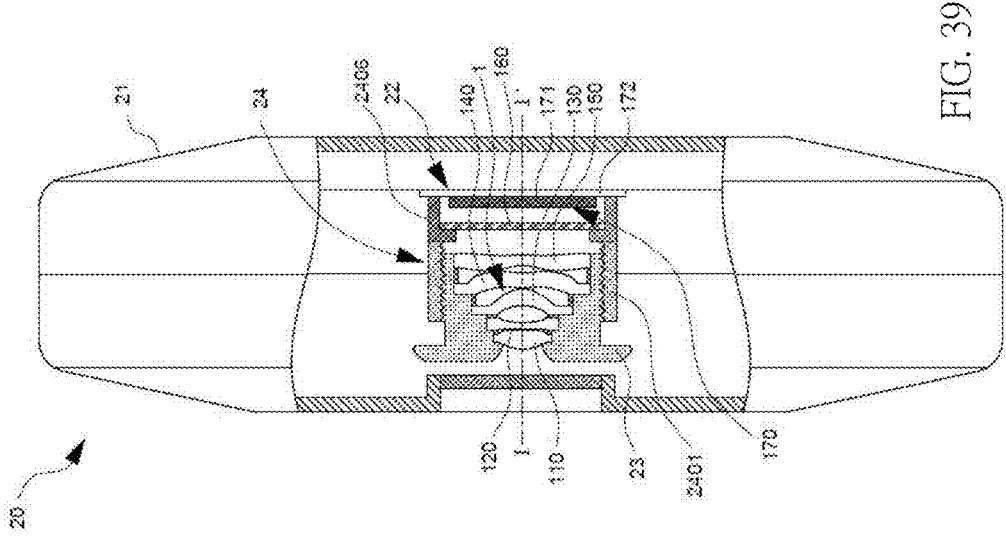
FIG. 39 is a structure of an example embodiment of a mobile device.

Reference is now made to FIG. 39, which illustrates an example structural view of a first embodiment of mobile device 20 applying an aforesaid optical imaging lens. The mobile device 20 may comprise a housing 21 and a photography module 22 positioned in the housing 21. Examples of the mobile device 20 may be, but are not limited to, a mobile phone, a camera, a tablet computer, a personal digital assistant (PDA), etc.

As shown in FIG. 39, the photography module 22 has an optical imaging lens with fixed focal length, wherein the photography module 22 may comprise the aforesaid optical imaging lens with five lens elements. For example, photography module 22 may comprise the optical imaging lens 1 of the first embodiment, a lens barrel 23 may be suitable for positioning the optical imaging lens 1, a module housing unit 24 may be suitable for positioning the lens barrel 23, a substrate 172 may be suitable for positioning the module housing unit 24, and an image sensor 171 which is positioned at an image side of the optical imaging lens 1. The image plane 170 is formed on the image sensor 171.

In some other example embodiments, the structure of the filtering unit 160 may be omitted. In some example embodiments, the housing 21, the lens barrel 23, and/or the module housing unit 24 may be integrated into a single component or assembled by multiple components. In some example embodiments, the image sensor 171 used in the present embodiment is directly attached to a substrate 172 in the form of a chip on board (COB) package, and such package is different from traditional chip scale packages (CSP) since COB package does not require a cover glass before the image sensor 171 in the optical imaging lens 1. Aforesaid exemplary embodiments are not limited to this package type and could be selectively incorporated in other described embodiments.

The five lens elements 110, 120, 130, 140, 150 may be positioned in the lens barrel 23 in the way of separated by an air gap between any two adjacent lens elements.

The module housing unit 24 may comprise a lens backseat 2401 for positioning the lens barrel 23 and an image sensor base 2406 positioned between the lens backseat 2401 and the image sensor 171. The lens barrel 23 and the lens backseat 2401 may be positioned along a same axis I-I', and the lens backseat 2401 is positioned at the inside of the lens barrel 23. The image sensor base 2406 is exemplarily close to the lens backseat 2401 here. The image sensor base 2406 could be optionally omitted in some other embodiments of the present disclosure.

Because the length of the optical imaging lens 1 is merely 4.626 mm, the size of the mobile device 20 may be quite small. Therefore, the embodiments described herein can decrease the cost of material and meet the market demand for smaller sized product designs.

Figure 40:
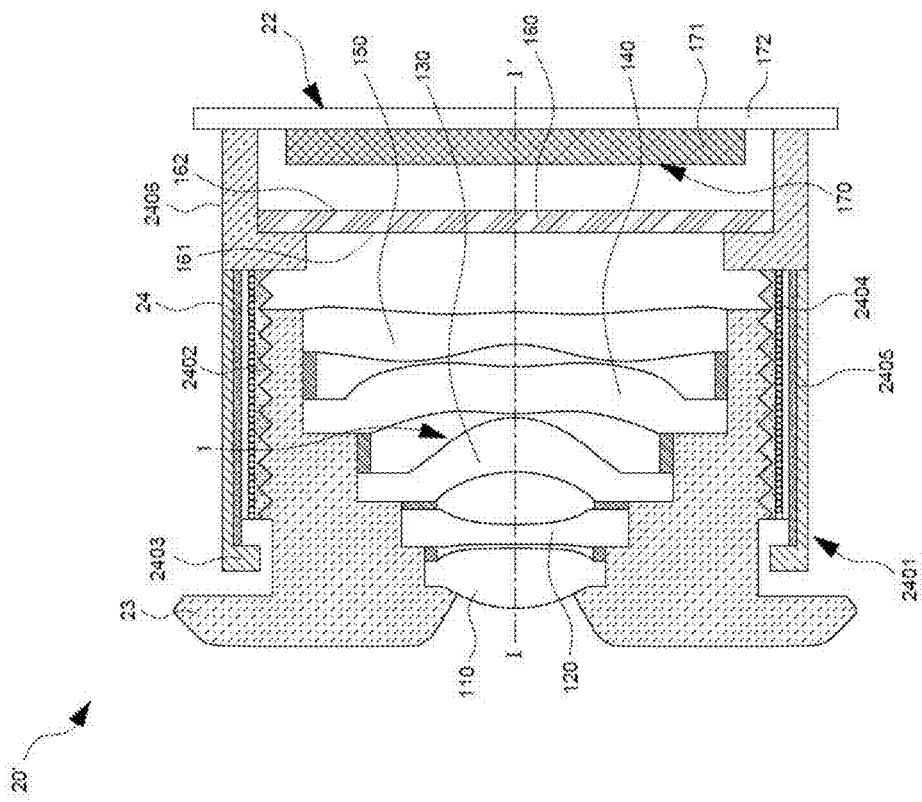
FIG. 40 is a partially enlarged view of the structure of another example embodiment of a mobile device.

Reference is now made to FIG. 40, which shows another structural view of a second embodiment of mobile device 20' applying the aforesaid optical imaging lens 1. One difference between the mobile device 20' and the mobile device 20 may be the lens backseat 2401 comprising a first seat unit 2402, a second seat unit 2403, a coil 2404 and a magnetic unit 2405. The first seat unit 2402 is close to the outside of the lens barrel 23, and positioned along an axis I-I', and the second seat unit 2403 is around the outside of the first seat unit 2402 and positioned along with the axis I-I'. The coil 2404 is positioned between the outside of the first seat unit 2402 and the inside of the second seat unit 2403. The magnetic unit 2405 is positioned between the outside of the coil 2404 and the inside of the second seat unit 2403.

The lens barrel 23 and the optical imaging lens 1 positioned therein are driven by the first seat unit 2402 for moving along the axis I-I'. The rest structure of the mobile device 20' is similar to the mobile device 20.

Similarly, because the length of the optical imaging lens 1 is 5.193 mm, is shortened, the mobile device 20' may be designed with a smaller size and meanwhile good optical performance is still provided. Therefore, the present embodiment decreases the cost of material and meets the demand of small sized product design and the request of the market.

According to above illustration, it is clear that the mobile device and the optical imaging lens thereof in example embodiments, through controlling the detail structure of the lens elements and an inequality, the length of the optical imaging lens is effectively shortened and meanwhile good optical characteristics are still provided.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising first, second, third, fourth, and fifth lens elements, each of said first, second, third, fourth, and fifth lens elements having refracting power, an object-side surface facing toward said object side and an image-side surface facing toward said image side and a central thickness defined along said optical axis, wherein:

said image-side surface of said first lens element comprises a convex portion in a vicinity of said optical axis and a convex portion in a vicinity of a periphery of said first lens element;

said object-side surface of said second lens element comprises a concave portion in a vicinity of said optical axis, and said image-side surface of said second lens element comprises a concave portion in a vicinity of said optical axis and a concave portion in a vicinity of a periphery of said second lens element;

said object-side surface of said third lens element comprises a convex portion in a vicinity of a periphery of said third lens element;

said image-side surface of said third lens element comprises a concave portion in a vicinity of said optical axis and a concave portion in a vicinity of a periphery of said third lens element;

said fourth lens element has positive refracting power, said object-side surface of said fourth lens element comprises a concave portion in a vicinity of said optical axis and a concave portion in a vicinity of a periphery of said fourth lens element;

said image-side surface of said fifth lens element comprises a concave portion in a vicinity of said optical axis;

said optical imaging lens comprises no other lenses having refracting power beyond said first, second, third, fourth, and fifth lens elements, a central thickness of said first lens element is represented by T1, a central thickness of said second lens element is represented by T2, an air gap between said second lens element and said third lens element along said optical axis is represented by G23, wherein T1, T2, and G23 satisfy the equation: $4.80 \geq (T1+T2)/G23 \geq 3.65$.

2. The optical imaging lens according to claim 1, wherein a central thickness of said third lens element is represented by T3, an air gap between said third lens element and said fourth lens element along said optical axis is represented by G34, wherein T3 and G34 satisfy the equation: $T3/G34 \leq 1.3$.

3. The optical imaging lens according to claim 2, wherein an effective focal length of the optical imaging lens is represented by EFL, a central thickness of said second lens element is represented by T2, a central thickness of said fourth lens element is represented by T4, wherein EFL, T2, and T4 satisfy the equation: $4.5 \geq EFL/(T2+T4) \geq 3.5$.

4. The optical imaging lens according to claim 1, wherein a sum of central thicknesses of said first, second, third, fourth, and fifth lens elements along said optical axis is represented by ALT, an air gap between said first lens element and said second lens element along said optical axis is represented by G12, an air gap between said fourth lens element and said fifth lens element along said optical axis is represented by G45, wherein ALT, G12 and G45 satisfy the equation: $ALT/(G12+G45) \leq 10.0$.

5. The optical imaging lens according to claim 4, wherein a sum of all four air gaps from said first lens element to said fifth lens element along said optical axis is represented by AAG, an air gap between said third lens element and said fourth lens element along said optical axis is represented by G34, wherein AAG and G34 satisfy the equation: $2.40 \geq AAG/G34 \geq 2.1$.

6. The optical imaging lens according to claim 1, wherein a sum of all four air gaps from said first lens element to said fifth lens element along said optical axis is represented by AAG, wherein AAG and T2 satisfy the equation: $4.80 \geq AAG/T2 \geq 2.9$.

7. The optical imaging lens according to claim 6, wherein a back focal length of said optical imaging lens, which is defined as a distance from said image-side surface of said fifth lens element to an image plane along said optical axis is represented by BFL, an air gap between said first lens element and said second lens element along said optical axis is represented by G12, wherein BFL, G12 and G23 satisfy the equation: $BFL/(G12+G23) \leq 3.7$.

8. The optical imaging lens according to claim 1, wherein an effective focal length of the optical imaging lens is represented by EFL, a central thickness of said third lens element is represented by T3, a central thickness of said fifth lens element is represented by T5, wherein EFL, T3, and T5 satisfy the equation: $3.7 \geq EFL/(T3+T5) \geq 3.3$.

9. The optical imaging lens according to claim 8, wherein an air gap between said first lens element and said second lens element along said optical axis is represented by G12, an air gap between said second lens element and said third lens element along said optical axis is represented by G23, a central thickness of said second lens element is represented by T2, wherein G12, G23, and T2 satisfy the equation: $1.7 \geq (G12+G23)/T2 \geq 1.2$.

10. The optical imaging lens according to claim 1, wherein an air gap between said third lens element and said fourth lens element along said optical axis is represented by G34, an air gap between said fourth lens element and said fifth lens element along said optical axis is represented by G45, wherein G34, G45, and T2 satisfy the equation: $3.20 \geq (G34+G45)/T2 \geq 2.1$.

11. The optical imaging lens according to claim 10, wherein a central thickness of said third lens element is represented by T3, a central thickness of said fourth lens element is represented by T4, a central thickness of said fifth lens element is represented by T5, wherein T3, T4 and T5 satisfy the equation: $(T3+T4)/T5 \leq 2.15$.

12. The optical imaging lens according to claim 1, wherein a central thickness of said fifth lens element is represented by T5, an air gap between said third lens element and said fourth lens element along said optical axis is represented by G34, wherein T2, T5 and G34 satisfy the equation: $(T2+T5)/G34 \leq 2.3$.

13. The optical imaging lens according to claim 12, wherein a back focal length of said optical imaging lens, which is defined as a distance from said image-side surface of said fifth lens element to an image plane along said optical axis is represented by BFL, a central thickness of said third lens element is represented by T3, wherein T2, T3 and BFL satisfy the equation: $2.30 \geq BFL/(T2+T3) \geq 2.0$.

14. A mobile device, comprising:
a housing; and
a photography module positioned in said housing and comprising:
an optical imaging lens, sequentially from an object side to an image side along an optical axis, comprising first, second, third, fourth, and fifth lens elements, each of said first, second, third, fourth, and fifth lens elements having refracting power, an object-side surface facing toward said object side and an image-side surface facing toward said image side and a central thickness defined along said optical axis, wherein:
said image-side surface of said first lens element comprises a convex portion in a vicinity of said optical axis and a convex portion in a vicinity of a periphery of said first lens element;
said object-side surface of said second lens element comprises a concave portion in a vicinity of said optical axis, and said image-side surface of said second lens element comprises a concave portion in a vicinity of said optical axis and a concave portion in a vicinity of a periphery of said second lens element;
said object-side surface of said third lens element comprises a convex portion in a vicinity of a periphery of said third lens element;
said image-side surface of said third lens element comprises a concave portion in a vicinity of said optical axis and a concave portion in a vicinity of a periphery of said third lens element;
said fourth lens element has positive refracting power, said object-side surface of said fourth lens element comprises a concave portion in a vicinity of said optical axis and a concave portion in a vicinity of a periphery of said fourth lens element;

said image-side surface of said fifth lens element comprises a concave portion in a vicinity of said optical axis;

said optical imaging lens comprises no other lenses having refracting power beyond said first, second, third, fourth, and fifth lens elements, a central thickness of said first lens element is represented by T1, a central thickness of said second lens element is represented by T2, an air gap between said second lens element and said third lens element along said optical axis is represented by G23, wherein T1, T2, and G23 satisfy the equation: $4.80 \geq (T1+T2)/G23 \geq 3.65$;

a lens barrel for positioning said optical imaging lens;

a module housing unit for positioning said lens barrel; and an image sensor positioned at said image side of said optical imaging lens.

* * * * *